United States Patent
Xu et al.

(10) Patent No.: US 12,040,962 B2
(45) Date of Patent: Jul. 16, 2024

(54) ROUTING INFORMATION MANAGEMENT METHOD AND APPARATUS, AND COMPUTER STORAGE MEDIUM

(71) Applicant: Huawei Technologies Co., Ltd., Shenzhen (CN)

(72) Inventors: Haijun Xu, Beijing (CN); Xudong Zhang, Beijing (CN); Rong Jiang, Beijing (CN); Feng Guo, Beijing (CN); Yi Xiong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 17/471,668

(22) Filed: Sep. 10, 2021

(65) Prior Publication Data
US 2022/0006720 A1    Jan. 6, 2022

Related U.S. Application Data

(63) Continuation of application No. PCT/CN2020/078916, filed on Mar. 12, 2020.

(30) Foreign Application Priority Data

Mar. 13, 2019 (CN) .......................... 201910190984.7

(51) Int. Cl.
*H04L 45/02* (2022.01)
*G06F 16/27* (2019.01)
(Continued)

(52) U.S. Cl.
CPC .............. *H04L 45/02* (2013.01); *G06F 16/27* (2019.01); *H04L 47/34* (2013.01); *H04L 69/326* (2013.01)

(58) Field of Classification Search
CPC ....... H04L 45/02; H04L 47/34; H04L 69/326; H04L 45/033; H04L 45/04; H04L 45/247;
(Continued)

(56) References Cited

U.S. PATENT DOCUMENTS 6,137,781 A * 10/2000 Goto ....................... H04L 45/54
370/255
6,757,248 B1 * 6/2004 Li ........................... H04L 1/188
370/252
(Continued)

FOREIGN PATENT DOCUMENTS

CN      1711729 A    12/2005
CN      1859423 A    11/2006
(Continued)

OTHER PUBLICATIONS

IEEE: A New Method of Fault Tolerance TCP—Li Zhao, Xu Ke, Xu Mingwei, Fu Lizheng, Wu Jianping. 2003 International Conference on Computer Networks and Mobile Computing (ICCNMC'03). IEEE Computer Society. (Year: 2003).*
(Continued)

*Primary Examiner* — Mohammed S Chowdhury
(74) *Attorney, Agent, or Firm* — Conley Rose, P.C.

(57) ABSTRACT

In a routing information management method, a primary route generation unit generates routing information related to a TCP packet, and the primary route generation unit sends the routing information and first identification information of the routing information to a database unit, where the first identification information is determined based on the TCP packet.

20 Claims, 14 Drawing Sheets

(51) Int. Cl.
*H04L 47/34* (2022.01)
*H04L 69/326* (2022.01)

(58) Field of Classification Search
CPC ....... H04L 45/28; H04L 47/193; G06F 16/27; G06F 16/273
See application file for complete search history.

(56) References Cited

U.S. PATENT DOCUMENTS

| | | | |
|---|---|---|---|
| 2002/0176355 A1* | 11/2002 | Mimms | H04L 49/552 370/219 |
| 2003/0233473 A1 | 12/2003 | Bonhomme et al. | |
| 2004/0090913 A1* | 5/2004 | Scudder | H04L 45/54 370/219 |
| 2004/0246902 A1 | 12/2004 | Weinstein et al. | |
| 2005/0220109 A1 | 10/2005 | Sudo et al. | |
| 2006/0062142 A1* | 3/2006 | Appanna | H04L 69/40 370/242 |
| 2007/0180311 A1 | 8/2007 | Harvey et al. | |
| 2011/0038255 A1* | 2/2011 | Zhou | H04L 45/60 370/218 |
| 2011/0213890 A1 | 9/2011 | Ward et al. | |
| 2014/0294021 A1 | 10/2014 | Jobert et al. | |
| 2019/0044878 A1* | 2/2019 | Steffen | H04L 47/34 |
| 2020/0084130 A1* | 3/2020 | Mokkapati | H04L 69/163 |
| 2020/0136955 A1 | 4/2020 | Chen et al. | |
| 2021/0258241 A1 | 8/2021 | Zhang et al. | |

FOREIGN PATENT DOCUMENTS

| | | |
|---|---|---|
| CN | 101610279 A | 12/2009 |
| CN | 106802932 A | 6/2017 |
| CN | 108259356 A | 7/2018 |
| CN | 109218202 A | 1/2019 |
| WO | 0247329 A2 | 6/2002 |
| WO | 2011019697 A2 | 2/2011 |
| WO | 2020093958 A1 | 5/2020 |

OTHER PUBLICATIONS

IEEE: Data Packet Header Actions in Fault Tolerance of Persistent Routing Sessions. Stefano-Noik Orzen, Sorin Babii. IEEE 2017 (Year: 2017).*
Network Working Group Y. Rekhter, Ed. Request for Comments (RFC): 4271; A Border Gateway Protocol 4 (BGP-4); Y. Rekhter, Ed et al., Jan. 2006. (Year: 2006).*
Internet Engineering Task Force (IETF); Request for Comments (RFC): 6824; TCP Extensions for Multipath Operation with Multiple Addresses; Ford et al. ; Jan. 2013 (Year: 2013).*
Rong, C., "Research on Synchronous Replication Technology Based on Message-oriented Middleware in Mobile Database System," Southeast University, 2011, 4 pages (abstract ).
Zhiyong, L., et al., "Routing management model in distributed routers," Journal of Tsinghua University (Science and Technology), Apr. 2003, 4 pages.

\* cited by examiner

ROUTING INFORMATION MANAGEMENT METHOD AND APPARATUS, AND COMPUTER STORAGE MEDIUM

CROSS-REFERENCE TO RELATED APPLICATIONS

This is a continuation of Int'l Patent App. No. PCT/CN2020/078916, filed on Mar. 12, 2020, which claims priority to Chinese Patent App. No. 201910190984.7, filed on Mar. 13, 2019, both of which are incorporated by reference.

FIELD

This disclosure relates to the field of communications technologies, and in particular, to a routing information management method and apparatus, and a computer storage medium.

BACKGROUND

A Border Gateway Protocol (BGP) non-stop routing (NSR) technology can ensure that a BGP peer connection and a BGP route are uninterrupted when a device is faulty, to improve system reliability. In a specific implementation process, system reliability can be improved by using hardware or software. For example, system reliability is improved by using software. In a conventional system architecture, two route generation units may be deployed: a primary route generation unit and a secondary route generation unit. When the primary route generation unit is faulty, the secondary route generation unit may take over a task of the primary route generation unit. In specific implementation, after the primary route generation unit perceives that the secondary route generation unit is in service, the primary route generation unit needs to actively synchronize routing information to the secondary route generation unit. Because a large amount of routing information needs to be synchronized, system resources of the primary route generation unit are occupied for a long time during the synchronization. As a result, performance of processing a real-time packet by the primary route generation unit is affected. In this case, the primary route generation unit and the secondary route generation unit are coupled to each other, and software complexity is high.

SUMMARY

Embodiments provide a routing information management method and apparatus, and a computer storage medium, to decouple a primary route generation unit from a secondary route generation unit, reduce software complexity, and improve performance of the primary route generation unit.

According to a first aspect, an embodiment provides a routing information management method. A primary route generation unit generates routing information related to a Transmission Control Protocol (TCP) packet, and sends the routing information and first identification information of the routing information to a database unit, where the first identification information is determined based on the TCP packet.

In this technical solution, the primary route generation unit sends the routing information and the first identification information of the routing information to the database unit, to implement routing information synchronization between the primary route generation unit and a secondary route generation unit, and the primary route generation unit does not need to directly synchronize the routing information to the secondary route generation unit. This can decouple the primary route generation unit from the secondary route generation unit, reduce software complexity, and improve performance of the primary route generation unit.

In a possible implementation, an active TCP transceiver unit may synchronize the TCP packet to at least one secondary route generation unit corresponding to the primary route generation unit.

In this technical solution, the primary route generation unit sends the TCP packet to the secondary route generation unit through the active TCP transceiver unit, and the primary route generation unit does not need to directly send the TCP packet to the secondary route generation unit. This can decouple the primary route generation unit from the secondary route generation unit, reduce software complexity, and improve performance of the primary route generation unit.

In a possible implementation, the first identification information may be an end sequence number of the TCP packet.

In a possible implementation, the first identification information may be a timestamp corresponding to the TCP packet.

In a possible implementation, the routing information is generated by the primary route generation unit based on the TCP packet.

In a possible implementation, the TCP packet includes a part of or all of the routing information.

According to a second aspect, an embodiment discloses a routing information management method. A secondary route generation unit receives routing information and first identification information of the routing information from a database unit, and receives a TCP packet from an active TCP transceiver unit. After determining, based on the first identification information and the TCP packet, that the routing information matches the TCP packet, the secondary route generation unit may generate new routing information based on the routing information and the TCP packet.

In this technical solution, after determining, based on the first identification information and the TCP packet, that the routing information matches the TCP packet, the secondary route generation unit generates the new routing information based on the routing information and the TCP packet, and does not need to continuously receive routing information from the database unit. This can decouple the primary route generation unit from the secondary route generation unit, reduce software complexity, and improve performance of the primary route generation unit.

In a possible implementation, after determining, based on the first identification information and the TCP packet, that the routing information matches the TCP packet, the secondary route generation unit may stop receiving routing information from the database unit.

In a possible implementation, the secondary route generation unit may determine, based on the first identification information and the TCP packet in the following manner, that the routing information matches the TCP packet. When the first identification information is greater than or equal to second identification information carried in the TCP packet, the secondary route generation unit determines that the routing information matches the TCP packet.

In this technical solution, the primary route generation unit does not need to perceive the secondary route generation unit, and the secondary route generation unit may determine whether delimitation is completed, so that system resources of the primary route generation unit do not need to be occupied. This can improve performance of the primary route generation unit and reduce software complexity.

In a possible implementation, the secondary route generation unit may further calculate a first difference set between the routing information and the new routing information, and a second difference set between the new routing information and the routing information. When the first difference set is not an empty set but the second difference set is an empty set, the secondary route generation unit may send a deletion instruction to a routing node, where the deletion instruction carries the first difference set, and the deletion instruction is used to instruct the routing node to delete the first difference set.

In a possible implementation, after the secondary route generation unit calculates the first difference set between the routing information and the new routing information, and the second difference set between the new routing information and the routing information, when neither the first difference set nor the second difference set is an empty set, the secondary route generation unit may send an update instruction to the routing node, where the update instruction carries the first difference set and the second difference set, and the update instruction is used to instruct the routing node to update the first difference set to the second difference set.

In a possible implementation, after the secondary route generation unit calculates the first difference set between the routing information and the new routing information, and the second difference set between the new routing information and the routing information, when the first difference set is an empty set but the second difference set is not an empty set, the secondary route generation unit sends an addition instruction to the routing node, where the addition instruction carries the second difference set, and the addition instruction is used to instruct the routing node to add the second difference set.

In this embodiment, when the primary route generation unit is faulty, when the secondary route generation unit does not perceive the routing node, the following case is avoided by calculating a difference set: The secondary route generation unit sends, after being elected as the primary route generation unit, incorrect routing information to the routing node. This can implement that a BGP route is uninterrupted.

According to a third aspect, an embodiment provides a communications apparatus. The apparatus includes a primary route generation unit. The primary route generation unit includes a routing information generation module and a sending module. The routing information generation module and the sending module are configured to implement the routing information management method according to the first aspect.

According to a fourth aspect, an embodiment provides a communications apparatus. The apparatus includes a secondary route generation unit. The secondary route generation unit includes a routing information receiving module, a packet receiving module, a determining module, and a routing information generation module. The routing information receiving module, the packet receiving module, the determining module, and the routing information generation module are configured to implement the routing information management method according to the second aspect.

According to a fifth aspect, an embodiment provides a computer storage medium. The computer storage medium stores a computer program or instructions. When the program or the instructions is/are executed by a processor, the processor is enabled to perform the routing information management method according to the first aspect.

According to a sixth aspect, an embodiment provides a computer storage medium. The computer storage medium stores a computer program or instructions. When the program or the instructions is/are executed by a processor, the processor is enabled to perform the routing information management method according to the second aspect.

According to a seventh aspect, an embodiment provides a primary route generation unit, including a processor. The processor is coupled to a memory; the memory is configured to store instructions; and the processor is configured to execute the instructions in the memory, so that the primary route generation unit performs the routing information management method according to the first aspect.

According to an eighth aspect, an embodiment provides a secondary route generation unit, including a processor. The processor is coupled to a memory; the memory is configured to store instructions; and the processor is configured to execute the instructions in the memory, so that the secondary route generation unit performs the routing information management method according to the second aspect.

According to a ninth aspect, an embodiment provides a chip system, where the chip system includes a processor and an interface circuit, and the interface circuit is coupled to the processor; the processor is configured to execute a computer program or instructions, to implement the routing information management method according to the first aspect; and the interface circuit is configured to communicate with another module outside the chip system.

According to a tenth aspect, an embodiment provides a chip system, where the chip system includes a processor and an interface circuit, and the interface circuit is coupled to the processor; the processor is configured to execute a computer program or instructions to implement the routing information management method according to the second aspect; and the interface circuit is configured to communicate with another module outside the chip system.

DETAILED DESCRIPTION

Figure 1:
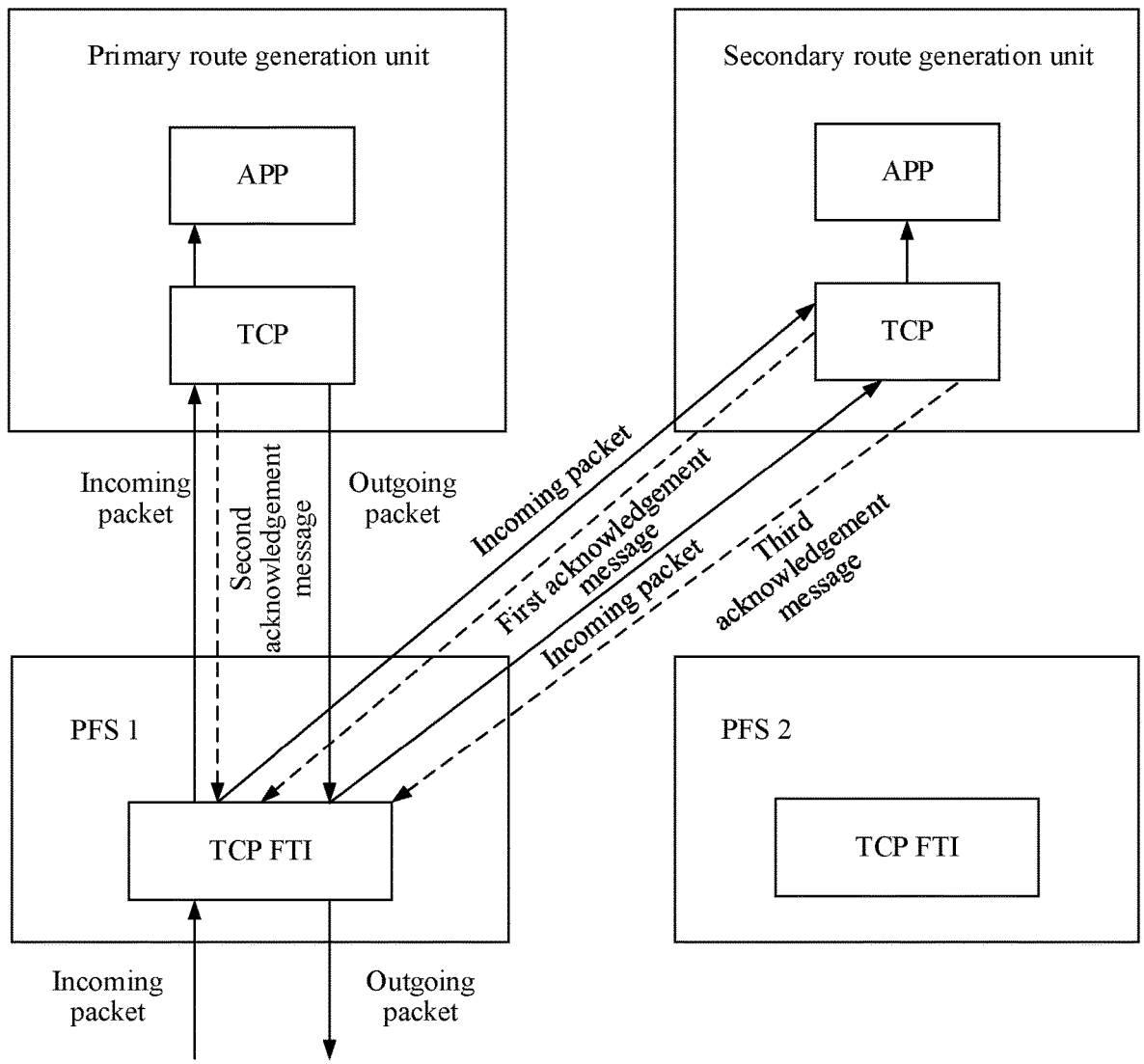
FIG. 1 is a schematic architectural diagram of a TCP packet management system according to an embodiment.

To better understand a routing information management method and apparatus, and a computer storage medium disclosed in the embodiments, the following first describes a TCP packet management system. FIG. 1 is a schematic architectural diagram of a TCP packet management system according to an embodiment. The TCP packet management system may include one primary route generation unit and at least one secondary route generation unit corresponding to the primary route generation unit.

The primary route generation unit and the at least one secondary route generation unit may run on different virtual machines of a same communications device, or may run on different communications devices. Each route generation unit (for example, the primary route generation unit or the secondary route generation unit) may include an application (APP) and a TCP module. The TCP module is configured to establish a TCP session with a routing node.

The primary route generation unit corresponds to a packet fault-tolerance service (PFS) 1 (for example, a first TCP transceiver unit), and the PFS 1 is independent of the primary route generation unit. The secondary route generation unit corresponds to a PFS 2 (for example, a second TCP transceiver unit), and the PFS 2 is independent of the secondary route generation unit. Each PFS (for example, the PFS 1 or the PFS 2) may include a TCP fault-tolerance infrastructure (FTI). The PFS and the corresponding route generation unit may run on different virtual machines of a same communications device, or may run on a same virtual machine of a same communications device, or may run on different communications devices. This is not specifically limited in the embodiments. One or more communication devices on which the primary route generation unit, one or more secondary route generation units, and at least two PFSs are run includes or include a processor and a memory in which computer-readable instructions for implementing the routing units and the PFSs is stored. One or more processors may execute the computer-readable instructions to implement the routing units and the PFSs.

In this embodiment, a plurality of route generation units may be deployed in the TCP packet management system. A leader election service (LES) may elect one route generation unit as the primary route generation unit from the plurality of deployed route generation units, and a route generation unit, other than the primary route generation unit, of the plurality of deployed route generation units is used as the secondary route generation unit. In the plurality of deployed route generation units, only the primary route generation unit creates a BGP peer connection to the routing node, and sends and/or receives a TCP packet. The TCP packet may include one or more of a first TCP packet (namely, an incoming packet) or a second TCP packet (namely, an outgoing packet). For example, the primary route generation unit receives the first TCP packet from the routing node. For another example, the primary route generation unit sends the second TCP packet to the routing node.

In the plurality of deployed route generation units, different route generation units correspond to different PFSs. The LES may further elect one PFS as an active PFS (for example, an active TCP transceiver unit) from PFSs corresponding to the plurality of deployed route generation units. In FIG. 1, for example, the active PFS is the PFS 1. The PFS 1 may synchronize a TCP packet to the at least one secondary route generation unit, that is, the active PFS implements packet consistency between the plurality of deployed route generation units.

In specific implementation, the primary route generation unit may establish a TCP session with the routing node in a manner such as three-way handshake, and the secondary route generation unit may synchronously obtain, through the active PFS, the TCP packet sent/received by/from the primary route generation unit.

In an implementation, an incoming packet is used as an example. It is assumed that the active PFS is the PFS 1, and a TCP FTI included in the PFS 1 is an active TCP FTI. The active TCP FTI receives an incoming packet from the routing node, and sends the incoming packet to the primary route generation unit and the secondary route generation unit. An outgoing packet is used as an example. It is assumed that the active PFS is the PFS 1, a TCP FTI included in the PFS 1 is an active TCP FTI, the active TCP FTI receives an outgoing packet from the primary route generation unit, and the active TCP FTI sends the outgoing packet to the primary route generation unit and the secondary route generation unit. In this embodiment, because the active TCP FTI does not perform packet synchronization acknowledgement, it cannot be effectively ensured that the secondary route generation unit successfully receives the TCP packet sent by the active TCP FTI. However, to implement tolerance against multi-point failures, a quantity of deployed route generation units may be greater than a quantity of required reliable route generation units. For example, the quantity of deployed route generation units and the quantity of required reliable route generation units may be in a proportional relationship. For another example, a difference between the quantity of deployed route generation units and the quantity of required reliable route generation units is greater than a preset value. For example, to implement tolerance against n-point failures, it needs to be ensured that at least n+1 route generation units are reliable, that is, it needs to be ensured that at least n secondary route generation units are reliable, and m×n+1 route generation units may be deployed, where the m×n+1 route generation units include one primary route generation unit and m×n secondary route generation units. The m×n secondary route generation units synchronize, through the active TCP transceiver unit, a packet sent/received by/from the primary route generation unit. n represents a positive integer, m represents a positive number, and m>1.

In an implementation, an incoming packet is used as an example. It is assumed that the active PFS is the PFS 1, a TCP FTI included in the PFS 1 is an active TCP FTI, the active TCP FTI receives an incoming packet from the routing node, and the active TCP FTI sends the incoming packet to the secondary route generation unit; and after each secondary route generation unit receives the incoming packet from the active TCP FTI, the secondary route generation unit sends a first acknowledgement message to the active TCP FTI. After the primary route generation unit receives the incoming packet from the active TCP FTI, the primary route generation unit sends a second acknowledgement message to the active TCP FTI. After receiving the first acknowledgement message from each secondary route generation unit, the active TCP FTI sends the second acknowledgement message to the routing node. Optionally, when the active TCP FTI does not receive the first acknowledgement message from any secondary route generation unit, the active TCP FTI may perform retransmission, for example, resend the incoming packet to the secondary route generation unit. In this embodiment, the active TCP FTI sends the second acknowledgement message from the primary route generation unit to the routing node only after receiving the first acknowledgement message from each secondary route generation unit, and the active TCP FTI performs retransmission when the active TCP FTI does not receive the first acknowledgement message from any secondary route generation unit. This can maintain strong consistency, of the incoming packet, between route generation units.

An outgoing packet is used as an example. It is assumed that the active PFS is the PFS 1, a TCP FTI included in the PFS 1 is an active TCP FTI, the active TCP FTI receives an outgoing packet from the primary route generation unit, and the active TCP FTI sends the outgoing packet to the secondary route generation unit. After receiving the outgoing packet from the active TCP FTI, the secondary route generation unit may send a third acknowledgement message to the active TCP FTI. After the active TCP FTI receives the third acknowledgement message from each secondary route generation unit, the active TCP FTI may send the outgoing packet to the routing node. Optionally, when the active TCP FTI does not receive the third acknowledgement message from any secondary route generation unit, the active TCP FTI may perform retransmission, for example, resend the outgoing packet to the secondary route generation unit. In this embodiment, the active TCP FTI sends the outgoing packet to the routing node only after receiving the third acknowledgement message from each secondary route generation unit, and the active TCP FTI performs transmission when the active TCP FTI does not receive the third acknowledgement message from any secondary route generation unit. This can maintain strong consistency, of the outgoing packet, between route generation units.

In an implementation, a quantity of route generation units that maintain strong consistency may be greater than or equal to a first preset quantity threshold. The first preset quantity threshold may be the quantity of required reliable route generation units. For example, to implement tolerance against n-point failures, it needs to be ensured that at least n+1 route generation units are reliable, and at least n+1 route generation units may be controlled to maintain strong consistency, where n represents a positive integer. For example, assuming that five route generation units are deployed in the routing information management system, the five route generation units include one primary route generation unit and four secondary route generation units. To implement tolerance against two-point failures, it needs to be ensured that at least three route generation units are reliable. If four route generation units are configured to maintain strong consistency, three secondary route generation units may be selected from the four secondary route generation units to synchronize a packet sent/received by/from the primary route generation unit. In this embodiment, at least n+1 route generation units are controlled to maintain strong consistency, and there is no need to control all deployed route generation units to maintain strong consistency. This can reduce, while implementing tolerance against n-point failures, overheads resulting from maintaining strong consistency.

In a conventional TCP packet management system, a primary route generation unit synchronizes a TCP packet that is sent/received by/from the primary route generation unit to a secondary route generation unit. Because the primary route generation unit needs to synchronize a large quantity of TCP packets, system resources of the primary route generation unit are occupied for a long time during the synchronization. As a result, performance of processing a real-time packet by the primary route generation unit is affected. In addition, if a fault occurs during packet synchronization of the primary route generation unit, a TCP packet sent by the primary route generation unit to the secondary route generation unit is inconsistent with a TCP packet sent/received by/from the primary route generation unit. As a result, reliability of packet synchronization is reduced.

However, in this embodiment, each TCP packet sent by the primary route generation unit is sent to the secondary route generation unit and the routing node through the active PFS. Each packet sent by the routing node is sent to the secondary route generation unit and the primary route generation unit through the active PFS. This ensures strong consistency, of an incoming packet and an outgoing packet, between route generation units. In this embodiment, system resources of the primary route generation unit do not need to be occupied for packet synchronization. This can improve performance of the primary route generation unit. In addition, a packet that is sent to the primary route generation unit by the active PFS is always consistent with a packet that is sent to the secondary route generation unit by the active PFS. This improves reliability of packet synchronization. Because strong consistency of an incoming packet and strong consistency of an outgoing packet are maintained between route generation units, if the primary route generation unit is faulty, a secondary route generation unit that is in strong consistency synchronization can take over the primary route generation unit, so that a BGP peer connection and a BGP route are uninterrupted. Because all route generation units are decoupled from other, programming is less complex, and a quantity of secondary route generation units may be increased to support tolerance against multi-point faults and provide higher reliability.

Figure 2:
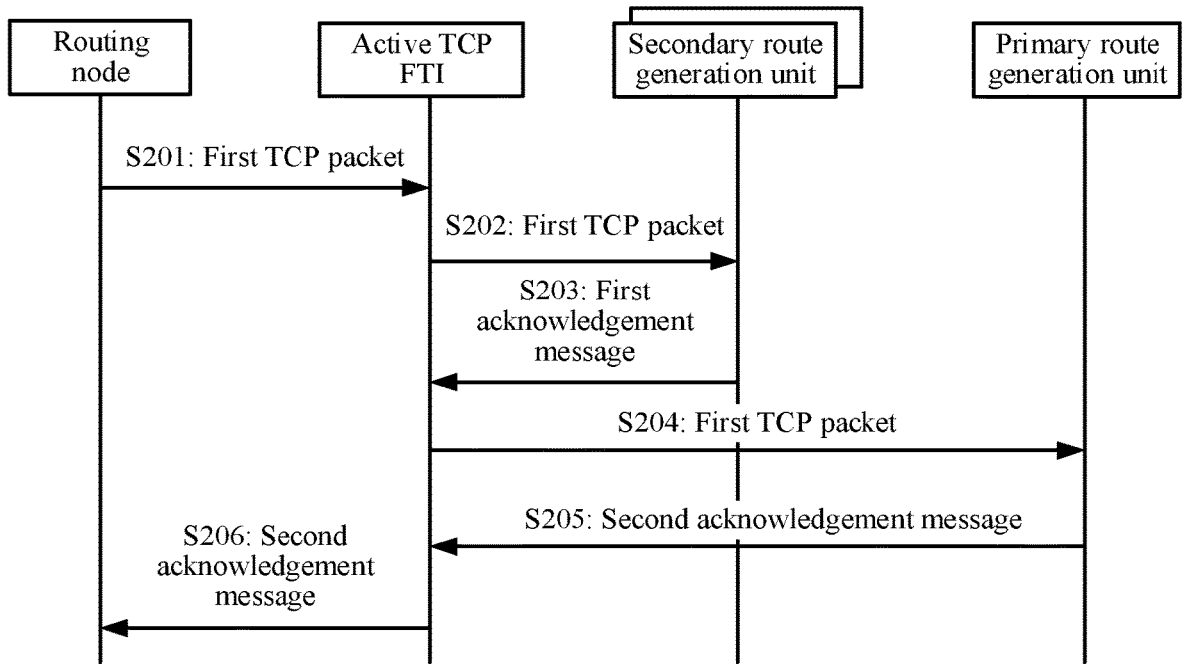
FIG. 2 is a schematic flowchart of a TCP packet management method according to an embodiment.

With reference to the TCP packet management system shown in FIG. 1, FIG. 2 provides a schematic flowchart of a TCP packet management method. The method includes but is not limited to the following steps.

Step S201: An active TCP FTI receives a first TCP packet from a routing node.

Step S202: The active TCP FTI sends the first TCP packet to at least one secondary route generation unit.

The secondary route generation unit configured to receive the first TCP packet may be a part of or all of secondary route generation units in a plurality of deployed route generation units. A quantity of secondary route generation units configured to receive the first TCP packet may be greater than or equal to a first preset quantity threshold. The first preset quantity threshold may be a difference obtained by subtracting 1 from a quantity of required reliable route generation units.

Step S203: Each secondary route generation unit sends a first acknowledgement message to the active TCP FTI when receiving the first TCP packet from the active TCP FTI.

Step S204: The active TCP FTI sends the first TCP packet to a primary route generation unit.

An execution sequence of step S202 and step S204 is not limited in this embodiment. For example, the active TCP FTI may send the first TCP packet to the secondary route generation unit after sending the first TCP packet to the primary route generation unit. For another example, the active TCP FTI may send the first TCP packet to the primary route generation unit and the secondary route generation unit at the same time. This is not specifically limited in this embodiment.

Step S205: The primary route generation unit sends a second acknowledgement message to the active TCP FTI after receiving the first TCP packet from the active TCP FTI.

Step S206: The active TCP FTI sends the second acknowledgement message to the routing node after receiving the first acknowledgement message from each of all secondary route generation units.

The all secondary route generation units refer to all secondary route generation units configured to receive the first TCP packet. For example, the TCP packet management system includes one primary route generation unit and n secondary route generation units. If it needs to ensure that at least three route generation units are reliable, k route generation units may be configured to maintain strong consistency, where $2 \leq k \leq n+1$, and both k and n are positive integers. A LES may select k−1 secondary route generation units from the n secondary route generation units. After receiving the first TCP packet from the routing node, the active TCP FTI may send the first TCP packet to the k−1 secondary route generation units; each secondary route generation unit sends the first acknowledgement message to the active TCP FTI when receiving the first TCP packet from the active TCP FTI; and the active TCP FTI sends the second acknowledgement message to the routing node after receiving the first acknowledgement message from each of the k−1 secondary route generation units.

In an implementation, when the active TCP FTI does not receive the first acknowledgement message from any secondary route generation unit within a first preset period of time, the active TCP FTI may resend the first TCP packet to the secondary route generation unit. In this embodiment, it can be ensured that the first TCP packet is successfully transmitted to each secondary route generation unit, to improve reliability of packet transmission.

In this embodiment, the active TCP FTI synchronizes the first TCP packet to the secondary route generation unit. After receiving the first acknowledgement message from each secondary route generation unit, the active TCP FTI sends the second acknowledgement message from the primary route generation unit to the routing node. This can maintain strong consistency, of the first TCP packet, between route generation units.

Figure 3:
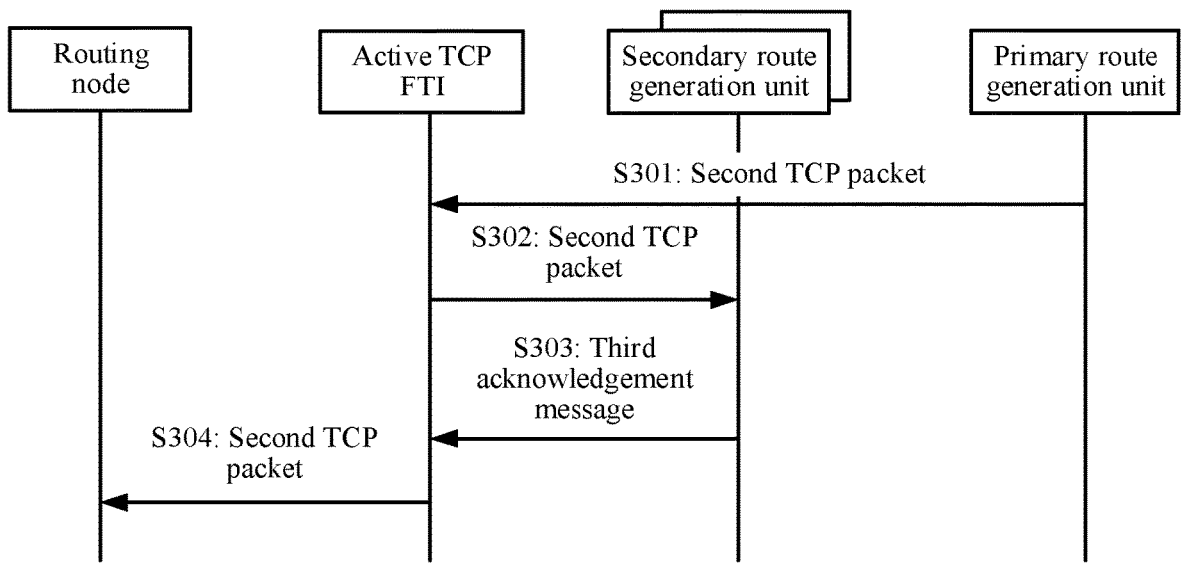
FIG. 3 is a schematic flowchart of another TCP packet management method according to an embodiment.

With reference to the TCP packet management system shown in FIG. 1, FIG. 3 provides a schematic flowchart of another TCP packet management method. The method includes but is not limited to the following steps.

Step S301: An active TCP FTI receives a second TCP packet from a primary route generation unit.

Step S302: The active TCP FTI sends the second TCP packet to at least one secondary route generation unit.

The secondary route generation unit configured to receive the second TCP packet may be a part of or all of secondary route generation units in a plurality of deployed route generation units. A quantity of secondary route generation units configured to receive the second TCP packet may be greater than or equal to a first preset quantity threshold. The first preset quantity threshold may be a difference obtained by subtracting 1 from a quantity of required reliable route generation units.

Step S303: Each secondary route generation unit sends a third acknowledgement message to the active TCP FTI when receiving the second TCP packet from the active TCP FTI.

Step S304: The active TCP FTI sends the second TCP packet to a routing node after receiving the third acknowledgement message from each of all secondary route generation units.

The all secondary route generation units refer to all secondary route generation units configured to receive the second TCP packet. For example, the TCP packet management system includes one primary route generation unit and n secondary route generation units. If it needs to ensure that at least three route generation units are reliable, k route generation units may be configured to maintain strong consistency, where $2 \leq k \leq n+1$, and both k and n are positive integers. A LES may select k−1 secondary route generation units from the n secondary route generation units. After receiving the second TCP packet from the primary route generation unit, the active TCP FTI may send the second TCP packet to the k−1 secondary route generation units; each secondary route generation unit sends the third acknowledgement message to the active TCP FTI when receiving the second TCP packet from the active TCP FTI; and the active TCP FTI sends the second TCP packet to the routing node after receiving the third acknowledgement message from each of the k−1 secondary route generation units.

In an implementation, when the active TCP FTI does not receive the third acknowledgement message from any secondary route generation unit within a second preset period of time, the active TCP FTI may resend the second TCP packet to the secondary route generation unit. In this embodiment, it can be ensured that the second TCP packet is successfully transmitted to each secondary route generation unit, to improve reliability of packet transmission.

In this embodiment, the active TCP FTI synchronizes the second TCP packet from the primary route generation unit to the secondary route generation unit. After receiving the third acknowledgement message from each secondary route generation unit, the active TCP FTI sends the second TCP packet to the routing node. This can maintain strong consistency, of the second TCP packet, between route generation units.

Figure 4:
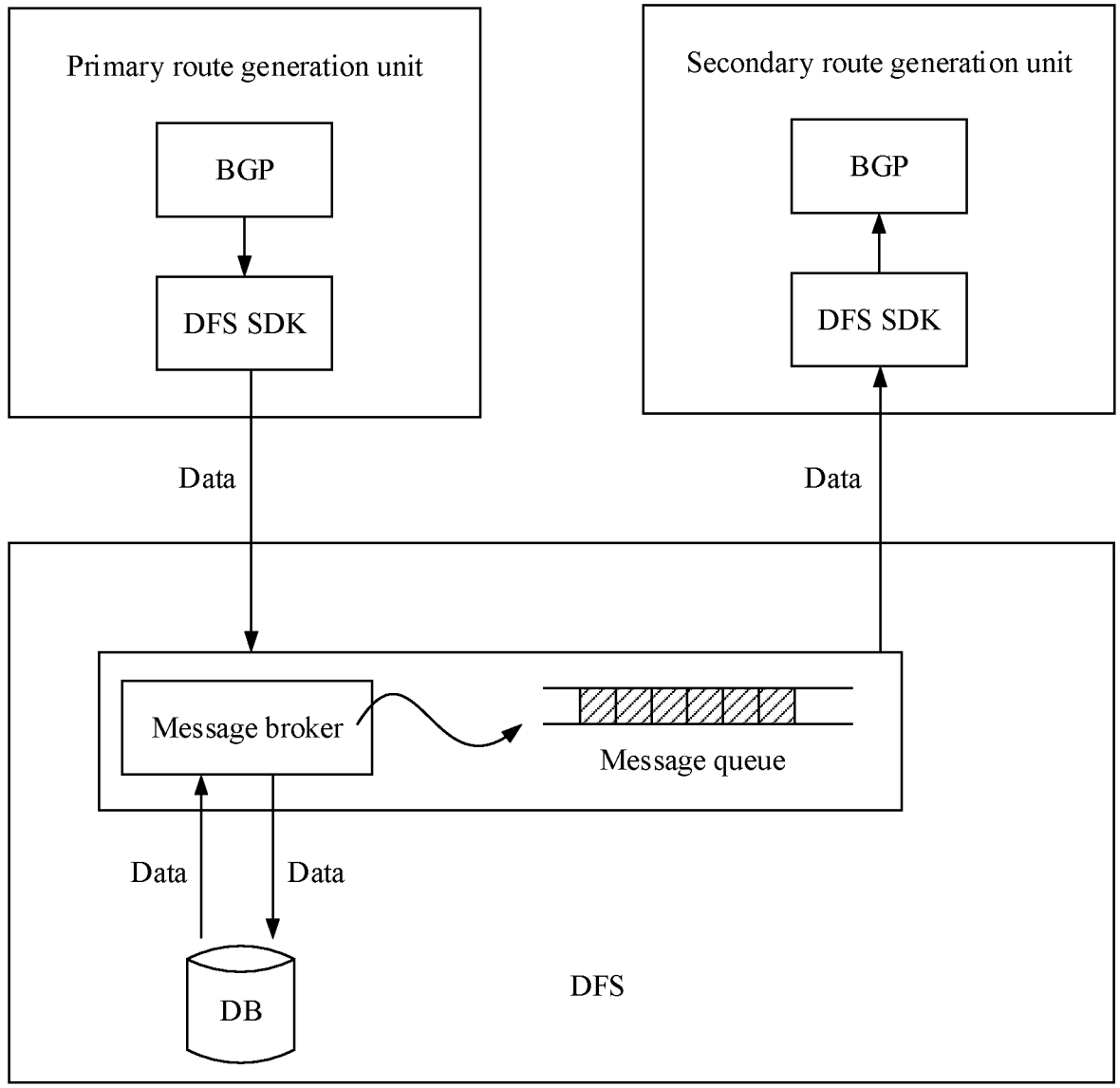
FIG. 4 is a schematic architectural diagram of a routing information management system according to an embodiment.

FIG. 4 is a schematic architectural diagram of another routing information management system according to an embodiment. The routing information management system may include one primary route generation unit, at least one secondary route generation unit, and a data fault-tolerance service (DFS) (for example, a database unit). Each route generation unit (for example, the primary route generation unit or the secondary route generation unit) may include a BGP module and a DFS software development kit (SDK) module. For example, a BGP module included in the primary route generation unit is a BGP 1, and a BGP module included in the secondary route generation unit is a BGP 2. The BGP module is configured to generate data, where the data may include one or more of BGP peer information, a routing information base input (RibIn), a routing information base output (RibOut), or routing information. The BGP peer information may include a peer negotiation result or a peer status, and the like. The DFS SDK module is configured for data transmission between the DFS SDK module and a DFS.

The DFS may include a message broker and a database (DB), and supports a mode of production from one producer and consumption by a plurality of consumers. The primary route generation unit, as a DFS producer, invokes a DFS SDK module in the primary route generation unit to write, into the DB, data generated by the BGP module in the primary route generation unit. After receiving the data from the DFS SDK module in the primary route generation unit, the message broker can send the data to the secondary route generation unit through a DFS SDK module in the secondary route generation unit. In addition, the secondary route generation unit, as a DFS consumer, may synchronize, through the DFS, the data generated by the primary route generation unit in the following manner. After a newly in-service secondary route generation unit sends registration information to the DFS, the DFS may determine that the secondary route generation unit is a new consumer; and the DFS may send, to the secondary route generation unit, historical data stored in the DB, and further send, to the secondary route generation unit, data generated in real time by the primary route generation unit. For a secondary route generation unit that has been in an in-service state, the DFS may send, to the secondary route generation unit, the data generated in real time by the primary route generation unit.

In an implementation, the primary route generation unit may parse a TCP packet to obtain routing information in the following manner. The primary route generation unit decapsulates the TCP packet to obtain data, and then the primary route generation unit parses the data based on a predefined format to obtain the routing information.

Figure 15:
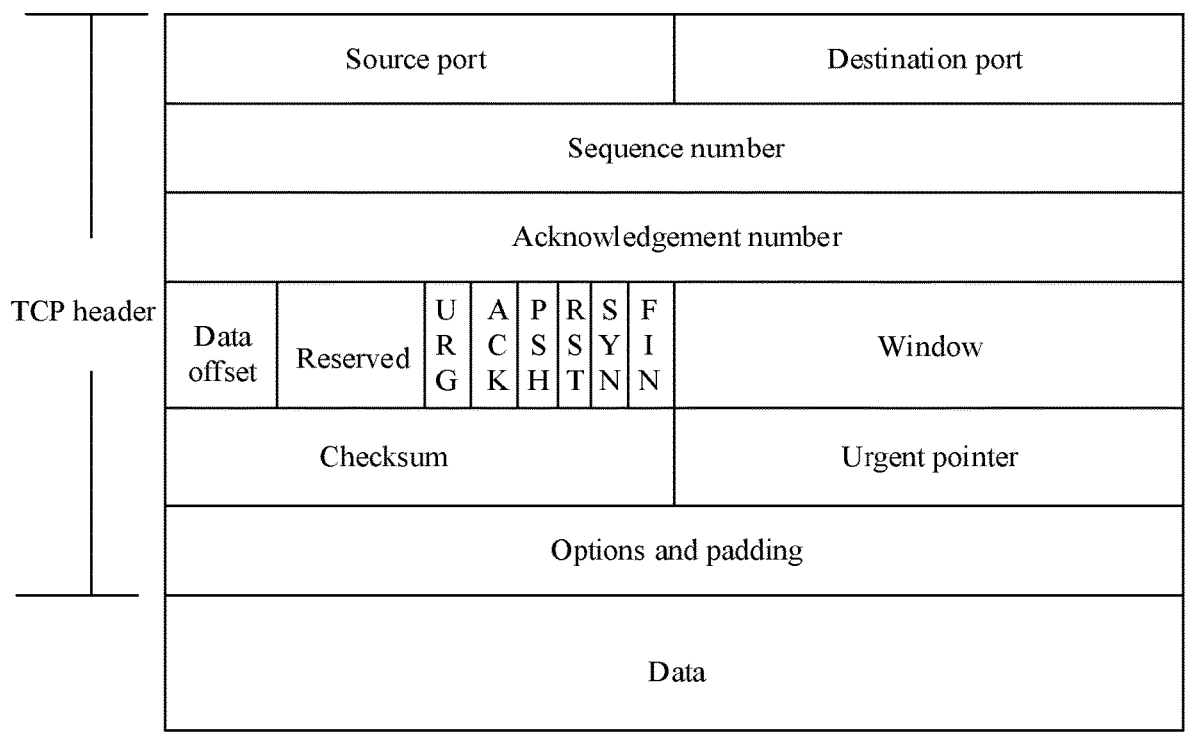
FIG. 15 is a schematic diagram of a packet format of a TCP packet according to an embodiment.

For example, FIG. 15 is a schematic diagram of a packet format of a TCP packet. The TCP packet includes a TCP header and data. The TCP header includes the following fields: source port, destination port, sequence number, acknowledgement number, data offset, reserved, control bits, window, checksum, urgent pointer, and options and padding. The control bits may include: an urgent pointer field significant (URG) flag, an acknowledgement (ACK) flag, a push (PSH) flag, a reset (RST) flag, a synchronous sequence (SYN) flag, and a finish (FIN) flag. The primary route generation unit may decapsulate the TCP packet to obtain the data included in the TCP packet, and then parse the data based on the predefined format to obtain the routing information.

In an implementation mode, the secondary route generation unit may read the peer status in real time. In the routing information management system, only the primary route generation unit creates a routing peer connection to the routing node. When the routing peer connection is created between the primary route generation unit and the routing node, the peer status is in service. When the routing peer connection between the primary route generation unit and the routing node is interrupted, the peer status is not in service. Based on this, the secondary route generation unit may determine, based on the peer status, whether the route peer connection between the primary route generation unit and the routing node is interrupted.

In comparison with a conventional routing information management system, the primary route generation unit needs to perceive the newly in-service secondary route generation unit. The primary route generation unit also needs to back up historical data generated by the primary route generation unit. After perceiving the newly in-service secondary route generation unit, the primary route generation unit needs to send the historical data to the secondary route generation unit. In other words, the primary route generation unit and the secondary route generation unit are coupled to each other. In addition, system resources of the primary route generation unit are occupied for a long time during data transmission because there is a relatively large amount of historical data. As a result, performance of generating data in real time by the primary route generation unit is affected.

However, in this embodiment, the data generated by the primary route generation unit is buffered in the DFS, and the data generated by the primary route generation unit is sent to the secondary route generation unit through the DFS, to implement data synchronization between the primary route generation unit and the secondary route generation unit. The primary route generation unit does not need to perceive the secondary route generation unit. This decouples the primary route generation unit from the secondary route generation unit. In addition, system resources of the primary route generation unit do not need to be occupied for packet synchronization. This can improve performance of the primary route generation unit.

Figure 5:
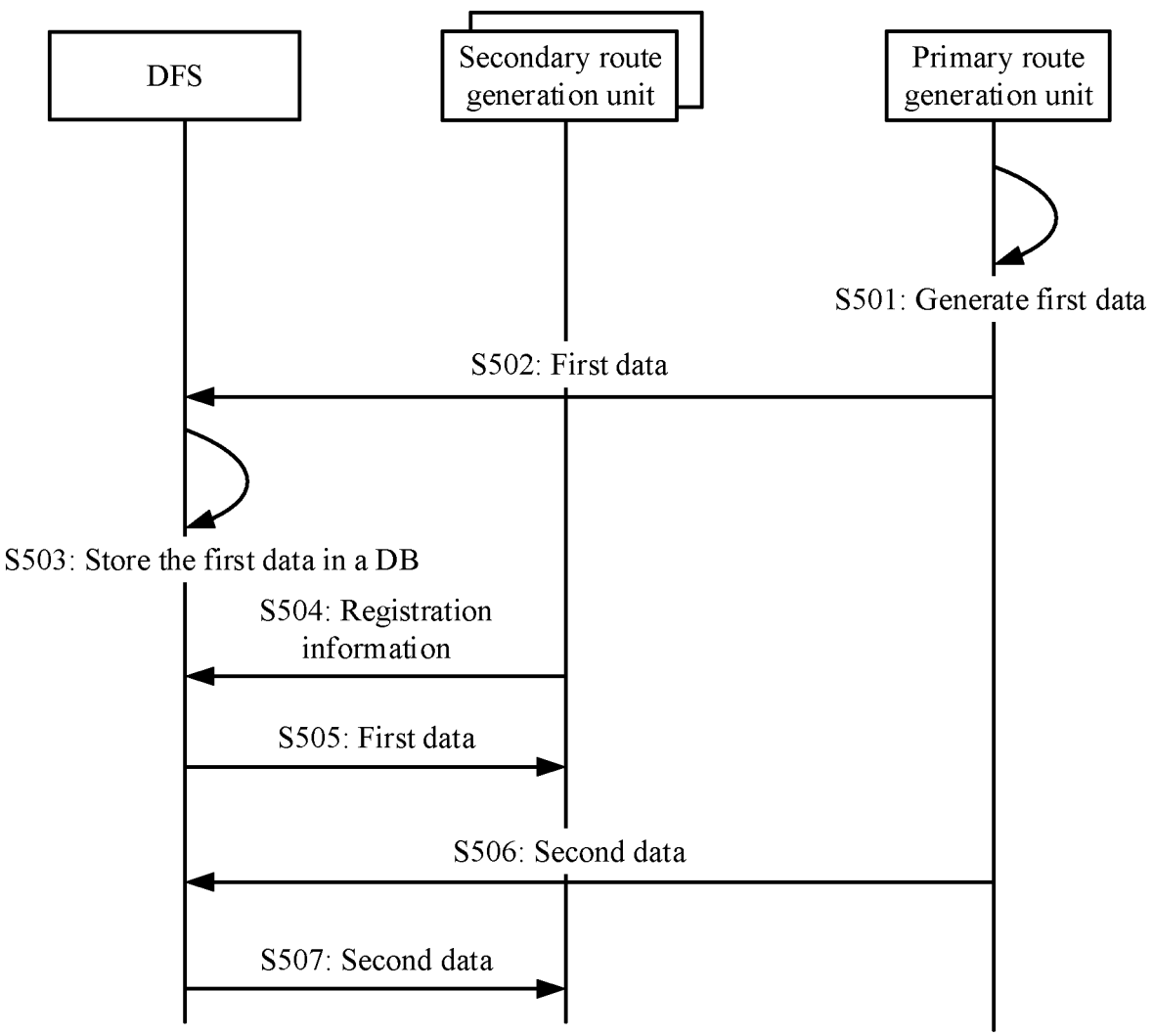
FIG. 5 is a schematic flowchart of a routing information management method according to an embodiment.

With reference to the routing information management system shown in FIG. 4, FIG. 5 provides a schematic flowchart of another routing information management method. The method includes but is not limited to the following steps.

Step S501: A primary route generation unit generates first data.

For example, the primary route generation unit may parse a first TCP packet from a routing node, to generate the first data. For another example, the primary route generation unit may parse a second TCP packet sent to the routing node, to generate the first data.

Step S502: The primary route generation unit sends the first data to a DFS.

Step S503: The DFS stores the first data in a DB.

Step S504: A secondary route generation unit sends registration information to the DFS.

Step S505: The DFS sends, to the secondary route generation unit, the first data stored in the DB.

For example, the first data packet stored in the DB includes a first route, a second route, and a third route. After the secondary route generation unit registers, the DFS may send the first route, the second route, and the third route in the DB to the secondary route generation unit.

Step S506: The DFS receives second data generated by the primary route generation unit.

Step S507: The DFS sends the second data to the secondary route generation unit.

For example, in a process in which the DFS sends the first route, the second route, and the third route in the DB to the secondary route generation unit, the primary route generation unit generates the second data in real time, where the second data is a fourth route. In this case, the DFS may send the fourth route to the secondary route generation unit.

In this embodiment, data generated by the primary route generation unit is sent to the secondary route generation unit through the DFS, to implement data synchronization between the primary route generation unit and the secondary route generation unit. The primary route generation unit does not need to perceive the secondary route generation unit, thereby decoupling the primary route generation unit from the secondary route generation unit. In addition, system resources of the primary route generation unit do not need to be occupied for packet synchronization. This can improve performance of the primary route generation unit.

Figure 6:
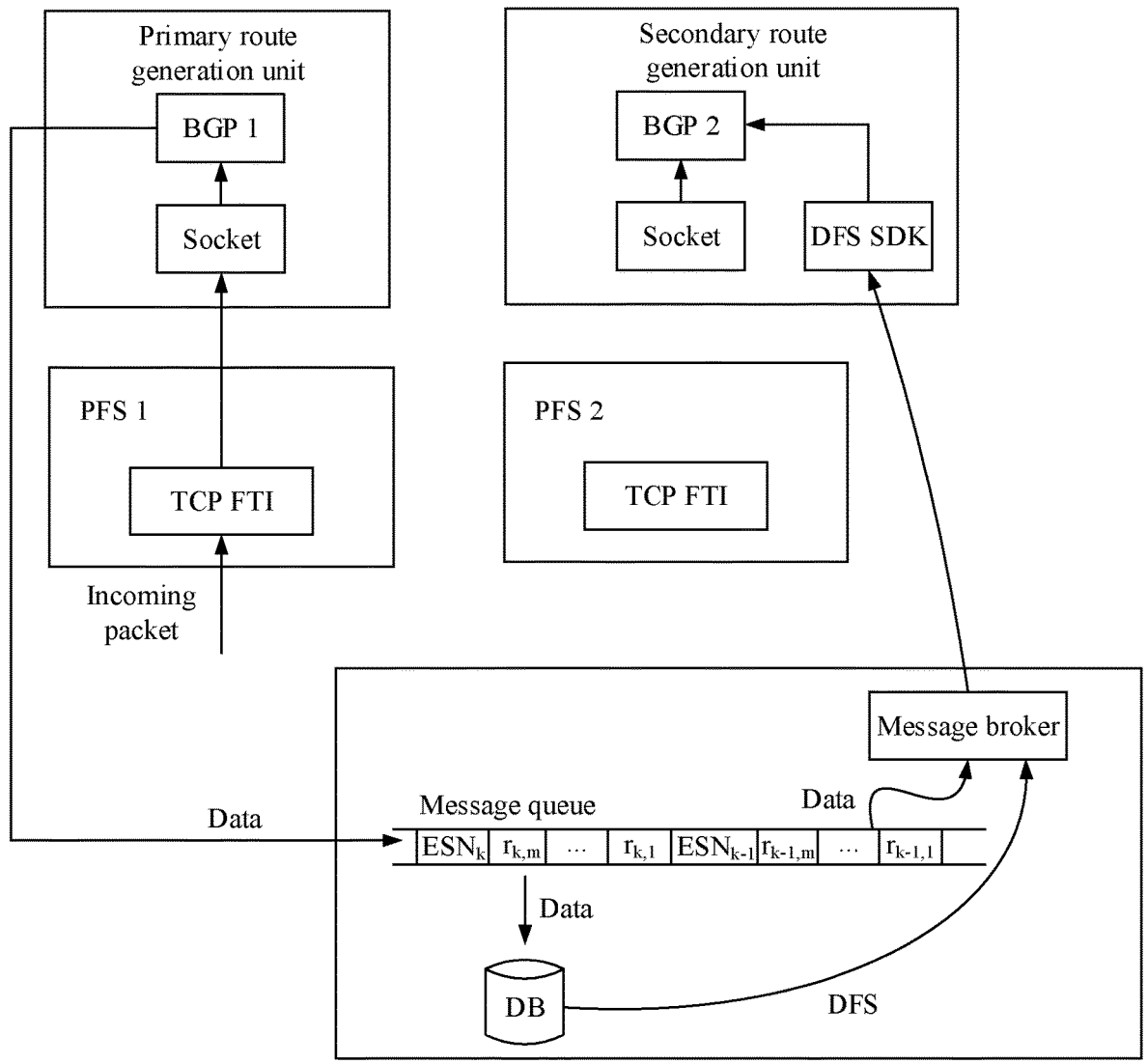
FIG. 6 is a schematic architectural diagram of another routing information management system according to an embodiment.

FIG. 6 is a schematic architectural diagram of another routing information management system according to an embodiment. The routing information management system may include one primary route generation unit, at least one secondary route generation unit, a PFS corresponding to each route generation unit, and a DFS. Each route generation unit (for example, the primary route generation unit or the secondary route generation unit) may include a BGP module and a socket module. For example, a BGP module included in the primary route generation unit is a BGP 1, and a BGP module included in the secondary route generation unit is a BGP 2. The BGP module is configured to generate data. Different route generation units correspond to different PFSs, and each PFS may include a TCP FTI. A LES may elect one PFS as an active PFS from PFSs corresponding to a plurality of route generation units deployed in the routing information management system. The active PFS may synchronize, to the secondary route generation unit, a TCP packet sent/received by/from the primary route generation unit. In addition, the primary route generation unit, as a DFS producer, writes, into a DB, data generated by the BGP 1. After receiving the data from a DFS SDK module in the primary route generation unit, a message broker can send the data to the secondary route generation unit through a DFS SDK module in the secondary route generation unit. In addition, the secondary route generation unit, as a DFS consumer, may synchronize, through the DFS, the data generated by the primary route generation unit in the following manner. After a newly in-service secondary route generation unit registers with the DFS, the DFS may determine that the secondary route generation unit is a new consumer; and the DFS may send, to the secondary route generation unit, historical data stored in the DB, and further send, through the message broker, data generated in real time by the primary route generation unit to the secondary route generation unit.

After data synchronization and packet synchronization between the primary route generation unit and the secondary route generation unit is implemented, a real-time protection state can be achieved through delimitation. If the primary route generation unit is faulty, the LES may elect one route generation unit as a primary route generation unit from secondary route generation units that are in the real-time protection state. The elected primary route generation unit creates a route peer connection to the routing node and sends and/or receives a BGP route, so that the BGP peer connection and the BGP route are uninterrupted. Delimitation refers to a seamless continuity between data obtained by the secondary route generation unit from the DFS and a TCP packet received by the secondary route generation unit from the active PFS. This ensures final consistency between the primary route generation unit and the secondary route generation unit.

Incoming delimitation is used as an example. The primary route generation unit receives an incoming packet from the routing node, and the BGP 1 parses the incoming packet to generate a plurality of RibIns. The primary route generation unit writes the RibIns into the DFS in a parsing sequence in real time. The DFS writes a dummy route after a last RibIn of the incoming packet. The dummy route carries a TCP end sequence number corresponding to the incoming packet, and indicates delimitation of the incoming packet. Each incoming packet corresponds to a TCP end sequence number, and different incoming packets correspond to different TCP end sequence numbers. As shown in FIG. 6, the dummy route is $ESN_k$, $ESN_{k-1}$, or the like in the figure, and a route between $ESN_k$ and $ESN_{k-1}$ corresponds to one incoming packet. The RibIns may include $r_{k-1,1}$, $r_{k-1,2}$, $r_{k-1,m}$, $r_{k,1}$, ..., and $r_{k,m}$. For example, RibIns obtained by parsing the complete incoming packet include $r_{k-1,1}$, $r_{k-1,2}$, ..., and $r_{k-1,m}$, and the primary route generation unit may write a dummy route after $r_{k-1,m}$, where the dummy route carries $ESN_{k-1}$. For another example, RibIns obtained by parsing a next complete incoming packet include $r_{k,1}$, $r_{k,2}$, ..., and $r_{k,m}$, and the primary route generation unit may write a dummy route after $r_{k,m}$, where the dummy route carries $ESN_k$. The DFS stores, in the DB, the RibIns that carry the dummy route. After a newly in-service secondary route generation unit registers with the DFS, the DFS may send historical data stored in the DB to the secondary route generation unit, where the historical data includes a RibIn and a dummy route. When the secondary route generation unit reads the dummy route, it indicates that a complete incoming packet is read. During data synchronization, the secondary route generation unit can receive an incoming packet from the active TCP FTI in real time. After reading the dummy route, the secondary route generation unit may compare a TCP end sequence number in the dummy route with a minimum TCP end sequence number in the incoming packet from the active TCP FTI. When the TCP end sequence number in the dummy route is greater than or equal to the minimum TCP end sequence number, it can be determined that incoming delimitation is completed. Before the delimitation is completed, the secondary route generation unit can only buffer the incoming packet received from the active TCP FTI, and cannot parse the incoming packet. After the delimitation is completed, the secondary route generation unit stops reading data from the DFS. Instead, the secondary route generation unit receives the incoming packet from the active TCP FTI, and parses the incoming packet to generate a RibIn.

Outgoing delimitation is used as an example. When the primary route generation unit sends an outgoing packet to the active TCP FTI, a timestamp T may be carried. The BGP 1 parses the outgoing packet to generate a plurality of RibOuts. The primary route generation unit writes the RibOuts into the DFS in a parsing sequence in real time. The DFS writes a dummy route after a last RibOut of the outgoing packet. The dummy route carries the timestamp T corresponding to the outgoing packet, and indicates delimitation of the outgoing packet. For example, in a routing information management system shown in FIG. 7, in a message queue of a DFS, a route between two timestamps corresponds to one outgoing packet. Each outgoing packet corresponds to one timestamp, and different outgoing packets correspond to different timestamps. The DFS stores, in the DB, the RibOuts that carry the dummy route. The RibOuts may include $r_{k-1,1}$, $r_{k-1,2}$, $r_{k-1,m}$, ..., and $r_{k,m}$. For example, RibOuts obtained by parsing the complete outgoing packet include $r_{k-1,1}$, $r_{k-1,2}$, ..., and $r_{k-1,m}$, and the primary route generation unit may write a dummy route after $r_{k-1,m}$, where the dummy route carries $T_{k-1}$. For another example, RibOuts obtained by parsing a next complete outgoing packet include $r_{k,1}$, $r_{k,2}$, ..., and $r_{k,m}$, and the primary route generation unit may write a dummy route after $r_{k,m}$, where the dummy route carries $T_k$. After a newly in-service secondary route generation unit registers with the DFS, the DFS may send historical data stored in the DB to the secondary route generation unit, where the historical data includes a RibOut and a dummy route. When the secondary route generation unit reads the dummy route, it indicates that a complete outgoing packet is read. During data synchronization, the secondary route generation unit can receive an outgoing packet from the active TCP FTI in real time. After reading the dummy route, the secondary route generation unit may compare the timestamp in the dummy route with a minimum timestamp in the incoming packet from the active TCP FTI. When the timestamp in the dummy route is greater than or equal to the minimum TCP timestamp, it can be determined that outgoing delimitation is completed. Before the delimitation is completed, the secondary route generation unit can only buffer the outgoing packet received from the active TCP FTI, and cannot parse the outgoing packet. After the delimitation is completed, the secondary route generation unit stops reading data from the DFS. Instead, the secondary route generation unit receives the outgoing packet from the active TCP FTI, and parses the outgoing packet to generate a RibOut.

In an implementation, before the delimitation is completed, the secondary route generation unit can only buffer the outgoing packet received from the active TCP FTI, and cannot parse the outgoing packet. In this case, if a large amount of route flapping occurs on a BGP peer, a large quantity of TCP packets are generated. To prevent a large amount of memory from being occupied due to a large quantity of packets buffered in the secondary route generation unit, a maximum quantity of packets buffered in the secondary route generation unit may be set. When a quantity of packets buffered in the secondary route generation unit is greater than a second preset quantity threshold, a packet may be overridden, that is, a packet that is stored for a longest time may be deleted. Once overriding is performed, routing chasing may fail. As a result, routing chasing may be performed for a plurality of times. If a delimitation time is long, and a flapping frequency exceeds a specific speed in an extreme case, routing chasing may never succeed. A reason for chasing for a plurality of times is as follows. A TCP packet is synchronized to the primary route generation unit and the secondary route generation unit through a PFS; the secondary route generation unit buffers the packet; the primary route generation unit parses the packet to generate a route, and writes the route into the DFS; and the secondary route generation unit reads, from the DFS, the route written by the primary route generation unit. It can be learned that a procedure in which the secondary route generation unit reads, from the DFS, the route that is written by the primary route generation unit is much longer than a procedure in which the secondary route generation unit buffers a packet. If route flapping of the BGP peer occurs frequently, a large quantity of TCP packets are generated. As a result, the quantity of packets buffered in the secondary route generation unit is greater than the second preset quantity threshold. In this case, a packet that has been stored for a longest time needs to be deleted. As a result, a TCP end sequence number or a timestamp, carried in a dummy route, read from the DFS by the secondary route generation unit is less than a buffered minimum TCP end sequence number or a buffered timestamp. Therefore, current chasing fails and next chasing needs to be performed. To resolve a problem of a long chasing time caused by route flapping, before delimitation is completed, the secondary route generation unit may parse a buffered packet to generate RibIns and RibOuts, and then buffer the generated RibIns and RibOuts. When route flapping occurs, the RibIns can be combined and the RibOuts can be combined because the RibIns and RibOuts are buffered. In this way, less memory is occupied, and overriding does not need to be performed. When the secondary route generation unit reads the dummy route from the DFS, if a TCP end sequence number carried in the dummy route is greater than or equal to the minimum TCP end sequence number of the buffered RibIns, incoming delimitation is completed. If a timestamp carried in the dummy route is greater than or equal to the minimum timestamp of the buffered RibOuts, outgoing delimitation is completed. Then, the secondary route generation unit combines the buffered RibIns and the RibIns that are read from the DFS, and combines the buffered RibOuts and the RibOuts that are read from the DFS. After the combination is completed, delimitation is completed.

In comparison with a conventional routing information management system, the primary route generation unit needs to perceive the newly in-service secondary route generation unit, and the primary route generation unit determines whether the newly in-service secondary route generation unit completes delimitation. System resources of the primary route generation unit are occupied for a long time during the delimitation. As a result, performance of generating data in real time by the primary route generation unit is affected.

However, in this embodiment, the primary route generation unit does not need to perceive the secondary route generation unit, the secondary route generation unit may determine whether delimitation is completed, and system resources of the primary route generation unit do not need to be occupied. This can improve performance of the primary route generation unit and reduce software complexity.

Figure 7:
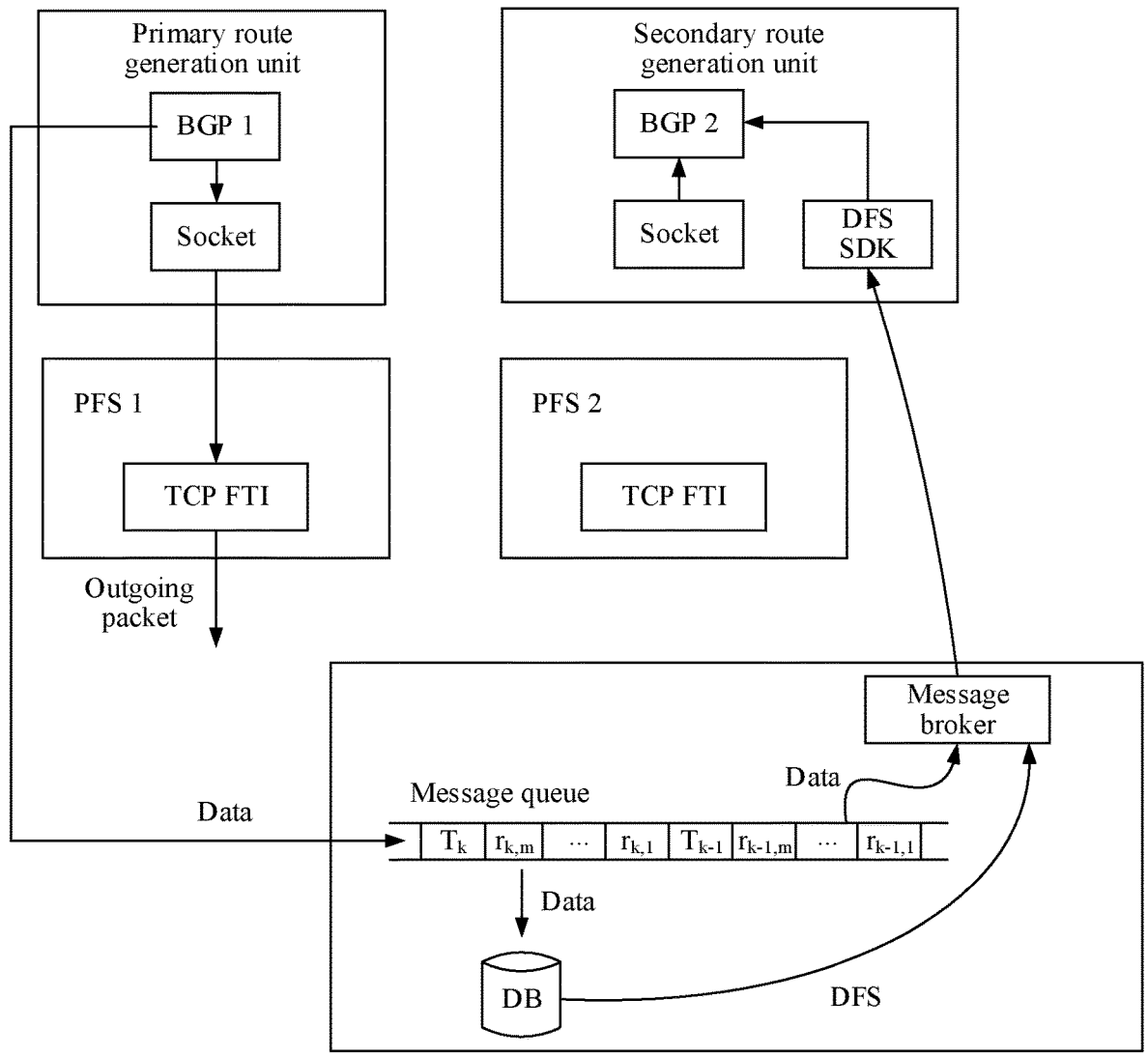
FIG. 7 is a schematic architectural diagram of another routing information management system according to an embodiment.
Figure 8:
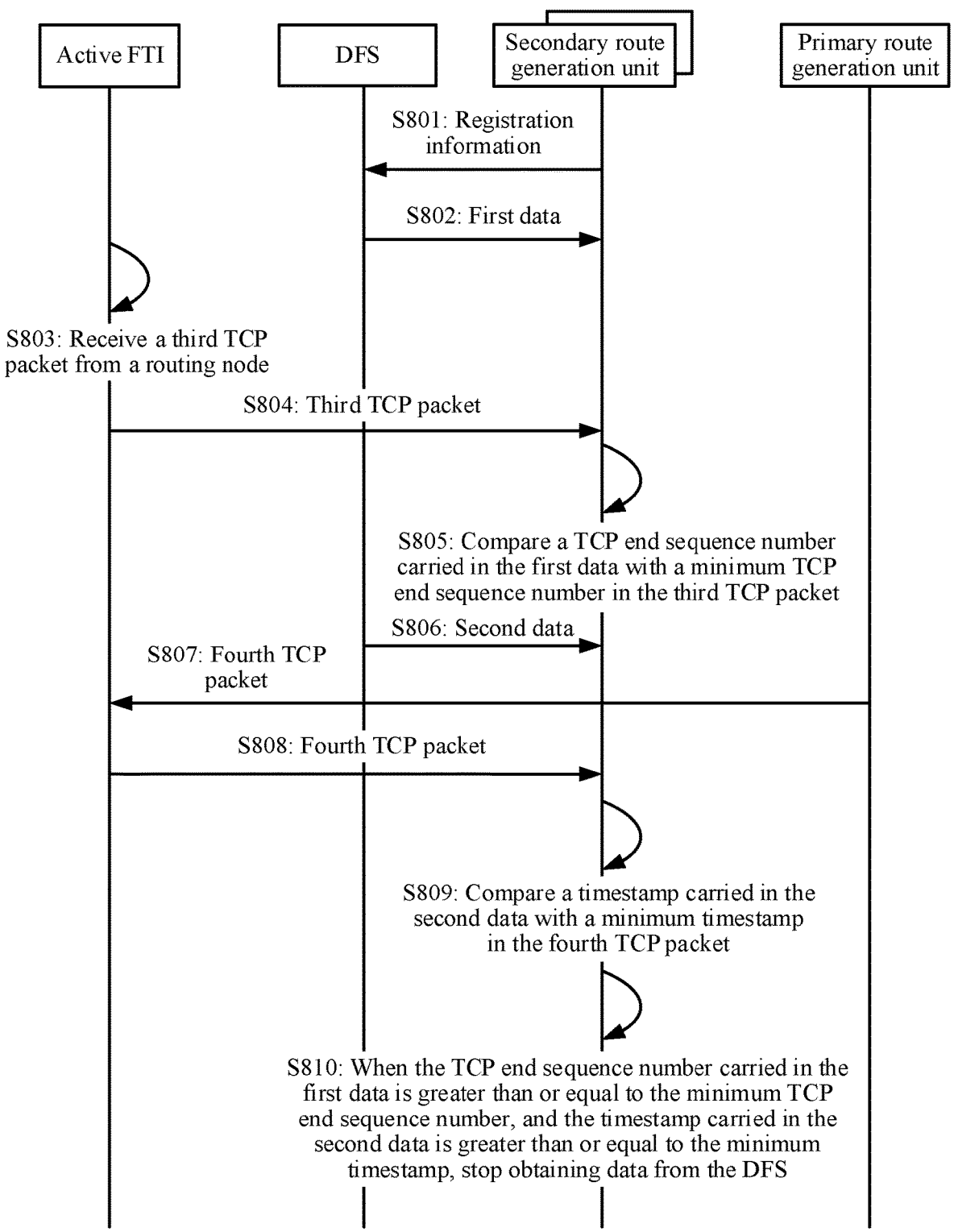
FIG. 8 is a schematic flowchart of another routing information management method according to an embodiment.

With reference to the routing information management system shown in FIG. 6 and FIG. 7, FIG. 8 provides a schematic flowchart of another routing information management method. The method includes but is not limited to the following steps.

Step S801: A secondary route generation unit sends registration information to a DFS.

The secondary route generation unit may send registration information to the DFS. The registration information may include a unit identifier of the secondary route generation unit. The registration information may be used to indicate that the secondary route generation unit is a new consumer.

Step S802: The DFS sends first data in a DB to the secondary route generation unit, where a last route included in the first data carries a TCP end sequence number, and the first data is obtained by parsing a first TCP packet by a primary route generation unit.

After receiving the first TCP packet from a routing node, the primary route generation unit may parse the first TCP packet to obtain the first data. The first TCP packet may include a part of or all of the first data, and the first data may include at least one route. The primary route generation unit stores the first data in the DB of the DFS. After the secondary route generation unit sends the registration information to the DFS, the DFS may determine that the secondary route generation unit is a new consumer, and then the DFS may send the first data stored in the DB to the secondary route generation unit.

Step S803: An active TCP FTI receives a third TCP packet from the routing node.

After generating the third TCP packet in real time, the routing node may send the third TCP packet to the active TCP FTI, and the active TCP FTI may send the third TCP packet to both the primary route generation unit and the secondary route generation unit. The third TCP packet may be an incoming packet.

An execution sequence of step S802 and step S803 is not limited in this embodiment. For example, after the active TCP FTI receives the third TCP packet from the routing node, the DFS sends the first data in the DB to the secondary route generation unit. For another example, when the active TCP FTI receives the third TCP packet from the routing node, the DFS sends the first data in the DB to the secondary route generation unit. This is not specifically limited in this embodiment.

Step S804: The active TCP FTI sends the third TCP packet to the secondary route generation unit.

Step S805: The secondary route generation unit compares the TCP end sequence number carried in the first data with a minimum TCP end sequence number in the third TCP packet.

The TCP end sequence number may be used to identify the first TCP packet. For example, the primary route generation unit parses the first TCP packet to obtain the first data, where the first data packet includes a first route, a second route, and a third route. The primary route generation unit may write a dummy route after the third route, where the dummy route carries the TCP end sequence number. After obtaining the TCP end sequence number, the secondary route generation unit may determine that complete data included in the first data has been successfully obtained.

Each time after receiving the third TCP packet from the routing node, the active TCP FTI may generate a TCP end sequence number of the third TCP packet. The active TCP FTI sends the third TCP packet and the TCP end sequence number of the third TCP packet to the secondary route generation unit.

When receiving the first data, the secondary route generation unit may obtain the TCP end sequence number carried in the first data. In addition, after receiving the third TCP packet, the secondary route generation unit may search TCP end sequence numbers of all received third TCP packets for the minimum TCP end sequence number, and compare the TCP end sequence number carried in the first data with the minimum TCP end sequence number in the third TCP packet.

Step S806: The DFS sends second data in the DB to the secondary route generation unit, where a last route included in the second data carries a timestamp, and the second data is obtained by parsing a second TCP packet by the primary route generation unit.

After generating the second TCP packet, the primary route generation unit may parse the second TCP packet to obtain the second data, where the second TCP packet may include a part of or all of the second data, and the second data may include at least one route. The primary route generation unit stores the second data in the DB of the DFS. After the secondary route generation unit sends registration information to the DFS, the DFS may determine that the secondary route generation unit is a new consumer, and then the DFS may send the second data stored in the DB to the secondary route generation unit.

An execution sequence of steps S802 to S805 and steps S806 to S809 is not limited in this embodiment.

Step S807: The active TCP FTI receives a fourth TCP packet from the primary route generation unit.

After generating the fourth TCP packet in real time, the primary route generation unit may send the fourth TCP packet to the active TCP FTI, and the active TCP FTI may send the fourth TCP packet to both the routing node and the secondary route generation unit. The fourth TCP packet may be an outgoing packet.

Step S808: The active TCP FTI sends the fourth TCP packet to the secondary route generation unit.

Step S809: The secondary route generation unit compares the timestamp carried in the second data with a minimum timestamp in the fourth TCP packet.

The timestamp may be used to identify the second TCP packet, and the timestamp may be a moment at which the primary route generation unit sends the second data to the DFS. For example, the primary route generation unit parses the second TCP packet to obtain the second data, where the second data packet includes a fourth route, a fifth route, and a sixth route. The primary route generation unit may write a dummy route after the sixth route, where the dummy route carries a timestamp. The primary route generation unit sends the second data and the timestamp carried in the second data to the DFS. After obtaining the timestamp, the secondary route generation unit may determine that complete data included in the second data has been successfully obtained.

Each time after receiving the fourth TCP packet from the primary route generation unit, the active TCP FTI may generate a timestamp of the fourth TCP packet. The active TCP FTI sends the fourth TCP packet and the timestamp of the fourth TCP packet to the secondary route generation unit.

When receiving the second data, the secondary route generation unit may obtain the timestamp carried in the second data. In addition, after receiving the fourth TCP packet, the secondary route generation unit may search timestamps of all received fourth TCP packets for a minimum timestamp, and compare the timestamp carried in the first data with the minimum timestamp in the fourth TCP packet.

Step S810: When the TCP end sequence number carried in the first data is greater than or equal to the minimum TCP end sequence number, and the timestamp carried in the second data is greater than or equal to the minimum timestamp, the secondary route generation unit stops obtaining data from the DFS.

In this embodiment, the primary route generation unit does not need to perceive the secondary route generation unit, the secondary route generation unit may determine whether delimitation is completed, and system resources of the primary route generation unit do not need to be occupied. This can improve performance of the primary route generation unit and reduce software complexity.

Figure 9:
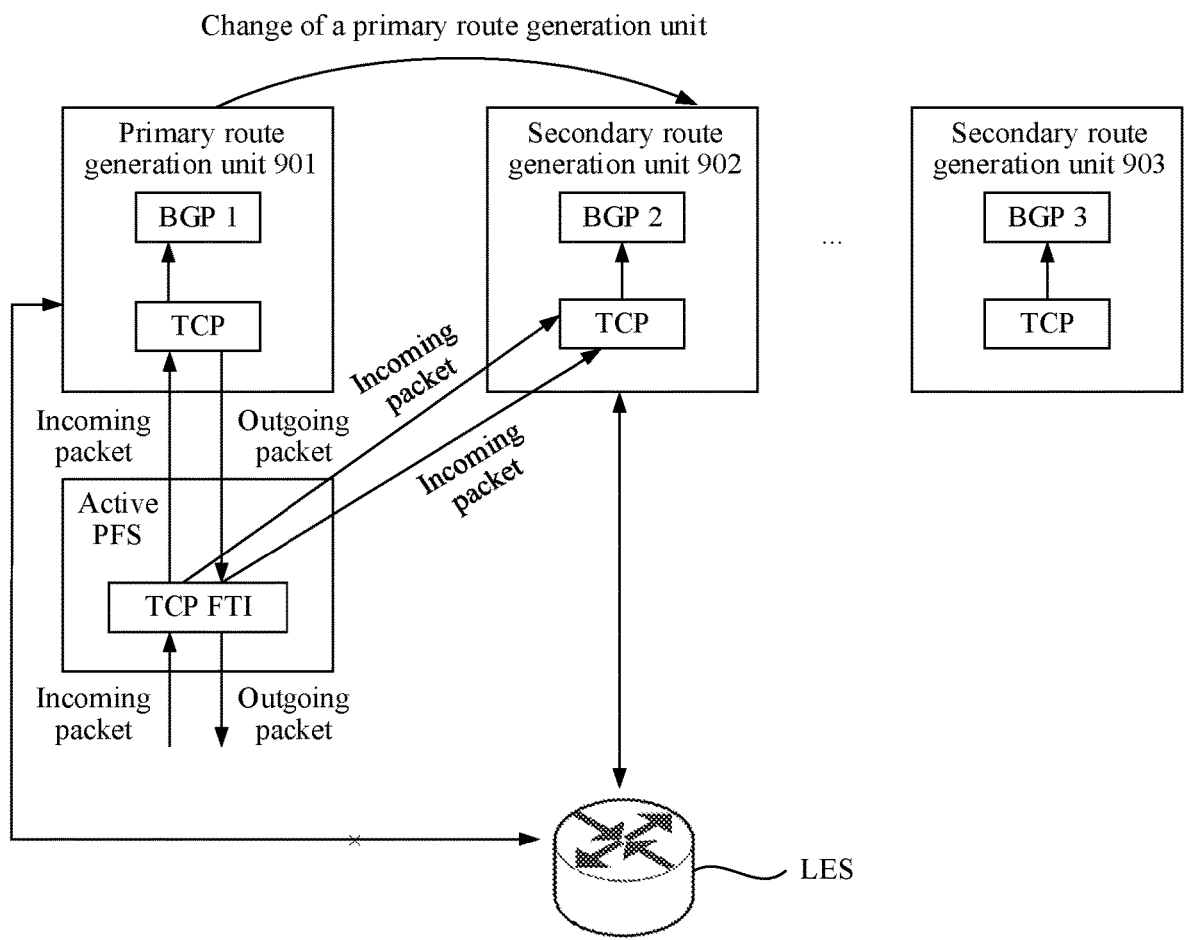
FIG. 9 is a schematic architectural diagram of another routing information management system according to an embodiment.

FIG. 9 is a schematic architectural diagram of another routing information management system according to an embodiment. The routing information management system may include one primary route generation unit 901, at least one secondary route generation unit (for example, a secondary route generation unit 902 and a secondary route generation unit 903), and a routing node. Each route generation unit (for example, the primary route generation unit or the secondary route generation unit) may include a BGP module. For example, a BGP module included in the primary route generation unit 901 is a BGP 1, and BGP modules included in the secondary route generation units are a BGP 2, a BGP 3, ..., and a BGP n. The BGP module is configured to generate data.

After the real-time protection state is achieved between the primary route generation unit 901 and the at least one secondary route generation unit, if the primary route generation unit 901 is faulty, a LES may elect one route generation unit (for example, the secondary route generation unit 902) as a primary route generation unit from the at least one secondary route generation unit. A route generation unit other than the primary route generation unit in the at least one secondary route generation unit is used as a secondary route generation unit. The elected primary route generation unit creates a BGP peer connection to the routing node, so that the BGP peer connection and a BGP route are uninterrupted.

In specific implementation, by using the packet management method shown in FIG. 2 or FIG. 3, before the primary route generation unit 901 is faulty, a TCP packet sent/ received by/from the primary route generation unit 901 is consistent with a TCP packet of each of the at least one secondary route generation unit. For example, the active TCP FTI sends a first TCP packet from the routing node to both the primary route generation unit 901 and the at least one secondary route generation unit. For another example, the active TCP FTI sends a second TCP packet generated by the primary route generation unit 901 to both the routing node and the at least one secondary route generation unit. After the primary route generation unit 901 is faulty, a TCP module in the elected primary route generation unit (for example, the secondary route generation unit 902) may establish a TCP session with the routing node. This prevents a TCP connection from being interrupted due to TCP packet discontinuity, and implements TCP connection continuity.

In addition, the secondary route generation unit 902 parses an incoming packet from an active PFS to generate a RibIn after completing delimitation. The secondary route generation unit 902 may generate new routing information based on the incoming packet and the RibIn, and obtain an outgoing packet based on the routing information (that is, the secondary route generation unit 902 simulates to send the outgoing packet of the secondary route generation unit 902 to the routing node based on the RibIn). The secondary route generation unit 902 parses the outgoing packet of the secondary route generation unit 902 to generate a RibOut set of the secondary route generation unit 902. The primary route generation unit 901 responds to the incoming packet from the active PFS to generate the outgoing packet of the primary route generation unit 901, and synchronizes the outgoing packet of the primary route generation unit 901 to the secondary route generation unit 902 through the active PFS. The secondary route generation unit 902 may parse the outgoing packet, from the active PFS, of the primary route generation unit 901 to generate a RibOut set of the primary route generation unit 901. After the secondary route generation unit 902 is elected as the primary route generation unit, the secondary route generation unit 902 may calculate a first difference set between the RibOut set of the primary route generation unit 901 and the RibOut set of the secondary route generation unit 902, and a second difference set between the RibOut set of the secondary route generation unit 902 and the RibOut set of the primary route generation unit 901. If the first difference set is not an empty set but the second difference set is an empty set, the secondary route generation unit 902 may send a deletion instruction to the routing node, where the deletion instruction carries the first difference set, and the deletion instruction is used to instruct the routing node to delete the first difference set. If neither the first difference set nor the second difference set is an empty set, the secondary route generation unit 902 may send an update instruction to the routing node, where the update instruction carries the first difference set and the second difference set, and the update instruction is used to instruct the routing node to update the first difference set to the second difference set. If the first difference set is an empty set but the second difference set is not an empty set, the secondary route generation unit 902 may send an addition instruction to the routing node, where the addition instruction carries the second difference set, and the addition instruction is used to instruct the routing node to add the second difference set. If the first difference set and the second difference set each are an empty set, the secondary route generation unit 902 may determine that a route sent by the primary route generation unit 901 to the routing node is correct. In this embodiment, when the primary route generation unit is faulty, when the secondary route generation unit does not perceive the routing node, the following case is avoided by calculating a difference set: The secondary route generation unit sends, after being elected as the primary route generation unit, an incorrect route to the routing node. This implements that a BGP route is uninterrupted.

In addition, the secondary route generation unit is in an active state. Before the primary route generation unit is faulty, the secondary route generation unit may parse a packet from the active PFS to generate a RibIn and a RibOut. After the secondary route generation unit is elected as the primary route generation unit, the routing node perceives switchover of the primary route generation unit, and directly switches a RIB (RIB) route to the elected primary route generation unit. In comparison with a conventional routing information management system, full data verification is not required, thereby improving processing performance of the routing information management system.

In addition, in the routing information management system, both the secondary route generation unit and the primary route generation unit are in the active state. The primary route generation unit and the secondary route generation unit each calculate a route, deliver a route, and generate a route peer connection. If data delivered by one of route generation units is inconsistent with data delivered by other route generation units, the routing node may determine that a service logic fault occurs on the route generation unit, and the routing node may generate service logic description information of the route generation unit, and output the service logic description information of the route generation unit. A user may respond to the service logic description information of the route generation unit, and perform version upgrade or take other repairing measures for the route generation unit. If a service logic fault occurs on the primary route generation unit, the routing node may trigger switchover of the primary route generation unit. In this embodiment, a logic fault can be found in a timely manner, so that a delay resulting from service impairment can be reduced.

In this embodiment, because a plurality of route generation units are deployed in the routing information management system, a BGP service is not affected provided that one secondary route generation unit is in the real-time protection state in a case of failures of a plurality of points.

Figure 10:
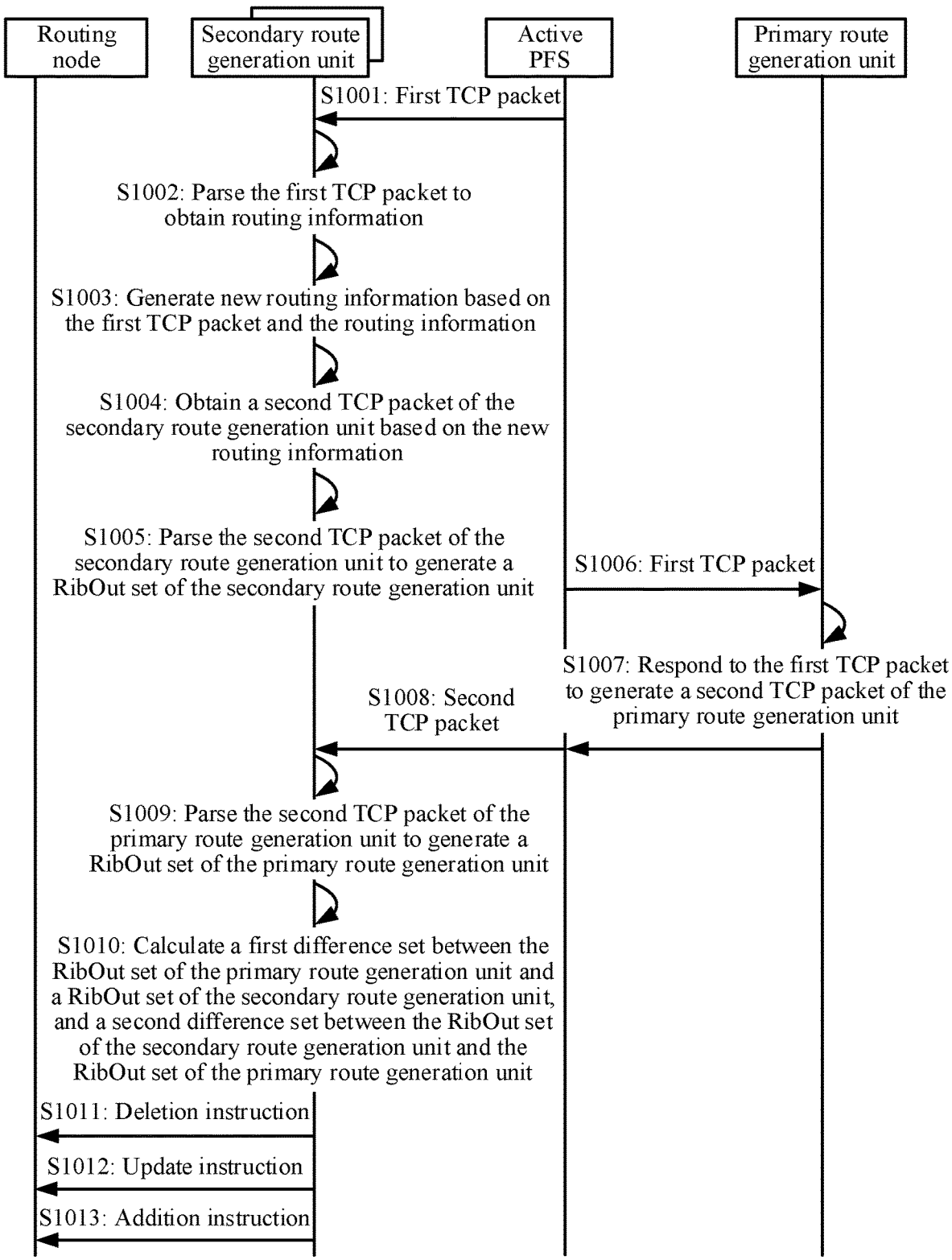
FIG. 10 is a schematic flowchart of another routing information management method according to an embodiment.

With reference to the routing information management system shown in FIG. 9, FIG. 10 provides a schematic flowchart of another routing information management method. The method includes but is not limited to the following steps.

Step S1001: A secondary route generation unit receives a first TCP packet from an active PFS.

Step S1002: The secondary route generation unit parses the first TCP packet to obtain routing information.

Step S1003: The secondary route generation unit generates new routing information based on the first TCP packet and the routing information.

Step S1004: The secondary route generation unit obtains a second TCP packet of the secondary route generation unit based on the new routing information.

Step S1005: The secondary route generation unit parses the second TCP packet of the secondary route generation unit to generate a RibOut set of the secondary route generation unit.

Step S1006: A primary route generation unit receives the first TCP packet from the active PFS.

Step S1007: The primary route generation unit responds to the first TCP packet to generate a second TCP packet of the primary route generation unit.

Step S1008: The primary route generation unit sends the second TCP packet of the primary route generation unit to the secondary route generation unit through the active PFS.

Step S1009: The secondary route generation unit parses the second TCP packet of the primary route generation unit to generate a RibOut set of the primary route generation unit.

Step S1010: The secondary route generation unit calculates a first difference set between the RibOut set of the primary route generation unit and the RibOut set of the secondary route generation unit, and a second difference set between the RibOut set of the secondary route generation unit and the RibOut set of the primary route generation unit.

The first difference set is a set in which elements belong to the RibOut set of the primary route generation unit but do not belong to the RibOut set of the secondary route generation unit. The second difference set is a set in which elements belong to the RibOut set of the secondary route generation unit but do not belong to the RibOut set of the primary route generation unit.

Figure 11A:
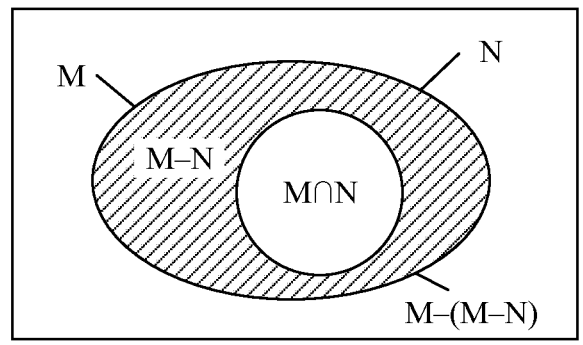
FIG. 11A is a schematic diagram of statuses of a first difference set and a second difference set according to an embodiment.

For example, in FIG. 11A, if a RibOut set M of the primary route generation unit completely includes a RibOut set N of the secondary route generation unit, the first difference set is a shaded part in FIG. 11A, and the shaded part is in a ring shape, that is, the first difference set is not an empty set. The second difference set is an empty set.

Figure 11B:
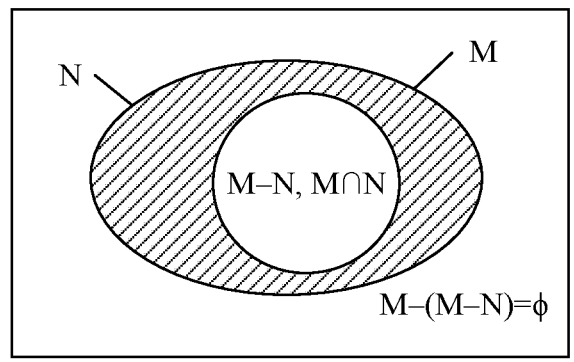
FIG. 11B is another schematic diagram of statuses of a first difference set and a second difference set according to an embodiment.

For example, in FIG. 11B, if a RibOut set N of the secondary route generation unit completely includes a RibOut set M of the primary route generation unit, the first difference set is an empty set, the second difference set is a shaded part in FIG. 11B, and the shaded part is in a ring shape, that is, the second difference set is not an empty set.

Figure 11C:
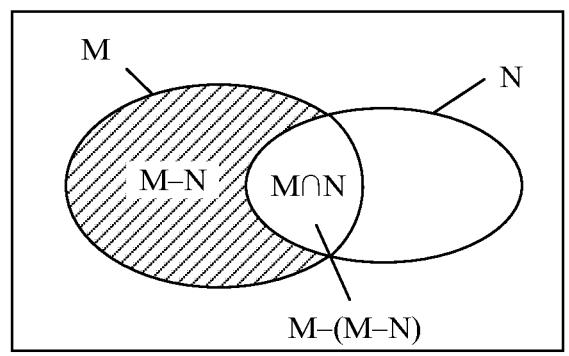
FIG. 11C is another schematic diagram of statuses of a first difference set and a second difference set according to an embodiment.

For example, in FIG. 11C, if a RibOut set M of the primary route generation unit and a RibOut set N of the secondary route generation unit partially overlap, the first difference set and the second difference set may be shown in FIG. 11C, that is, neither the first empty set nor the second difference set is an empty set.

Figure 11D:
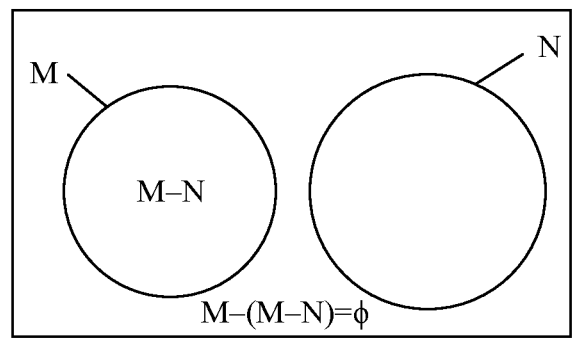
FIG. 11D is another schematic diagram of statuses of a first difference set and a second difference set according to an embodiment.

For example, in FIG. 11D, if a RibOut set M of the primary route generation unit and a RibOut set N of the secondary route generation unit do not overlap at all, the first difference set may be the set M, and the second difference set may be the set N, that is, neither the first empty set nor the second difference set is an empty set.

Step S1011: If the first difference set is not an empty set but the second difference set is an empty set, the secondary route generation unit sends a deletion instruction to a routing node. If neither the first difference set nor the second difference set is an empty set, the secondary route generation unit sends an update instruction to the routing node.

Step S1012: If neither the first difference set nor the second empty set is an empty set, the secondary route generation unit sends an update instruction to the routing node.

Step S1013: If the first difference set is an empty set but the second difference set is not an empty set, the secondary route generation unit sends an addition instruction to the routing node.

In this embodiment, when the primary route generation unit is faulty, when the secondary route generation unit does not perceive the routing node, the following case is avoided by calculating a difference set: The secondary route generation unit sends, after being elected as the primary route generation unit, an incorrect route to the routing node. This implements that a BGP route is uninterrupted.

Figure 12:
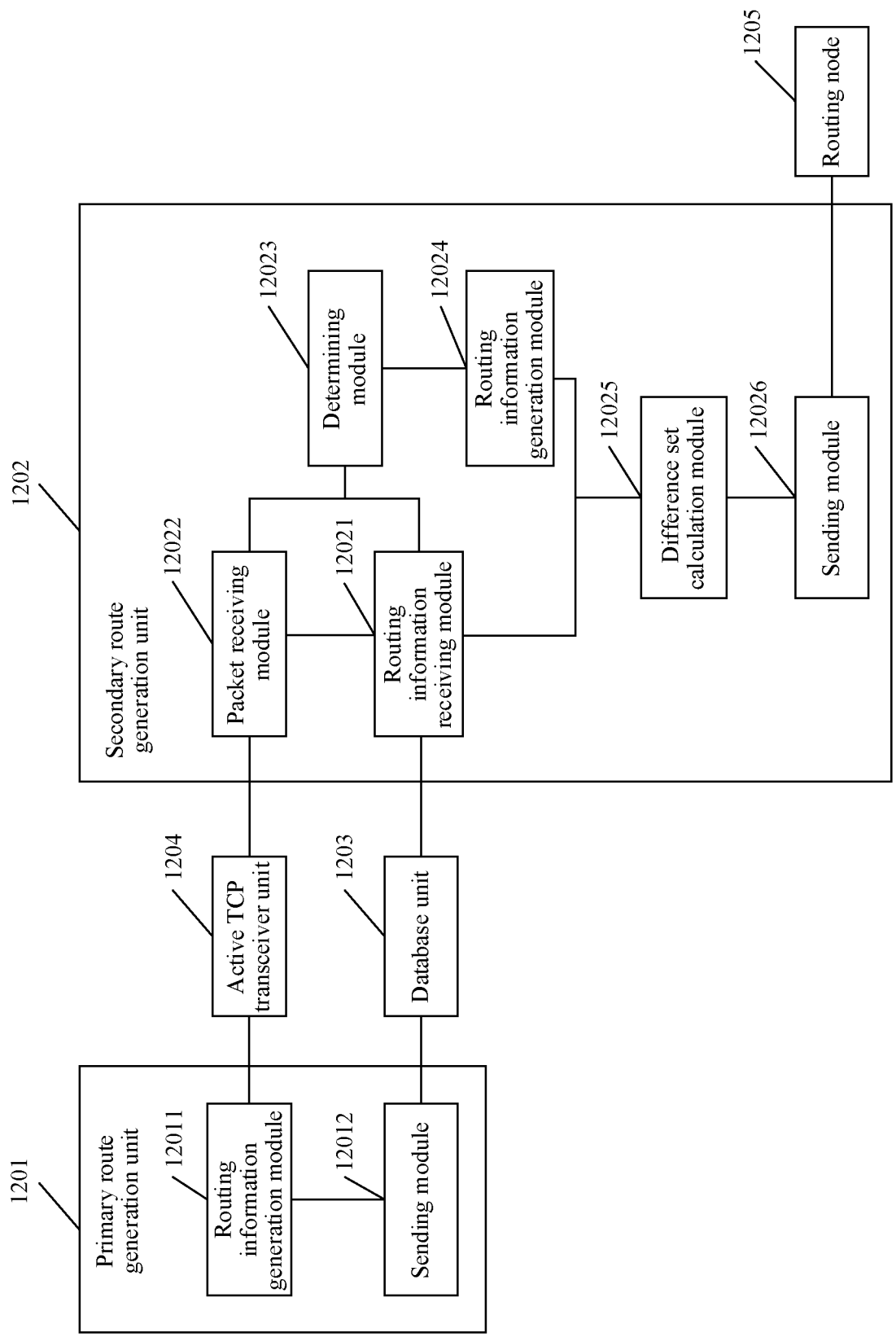
FIG. 12 is a schematic structural diagram of a routing information management system according to an embodiment.

FIG. 12 is a schematic structural diagram of a routing information management system according to an embodiment. The routing information management system may include a primary route generation unit 1201, at least one secondary route generation unit 1202, a database unit 1203, an active TCP transceiver unit 1204, and a routing node 1205. The primary route generation unit 1201 may include a routing information generation module 12011 and a sending module 12012. Each secondary route generation unit 1202 may include a routing information receiving module 12021, a packet receiving module 12022, a determining module 12023, and a routing information generation module 12024.

The routing information generation module 12011 is configured to generate routing information related to a TCP packet.

The sending module 12012 is configured to send the routing information and first identification information of the routing information to the database unit 1203, where the first identification information is determined based on the TCP packet.

The routing information receiving module 12021 is configured to receive the routing information and the first identification information of the routing information from the database unit 1203.

The packet receiving module 12022 is configured to receive the TCP packet from the active TCP transceiver unit.

The determining module 12023 is configured to determine, based on the first identification information and the TCP packet, that the routing information matches the TCP packet.

The routing information generation module 12024 is configured to generate new routing information based on the routing information and the TCP packet.

In an implementation, the routing information is generated by the routing information generation module 12011 based on the TCP packet.

In an implementation, the routing information receiving module 12021 is further configured to: after the determining module 12023 determines, based on the first identification information and the TCP packet, that the routing information matches the TCP packet, stop receiving routing information from the database unit 1203.

In an implementation, when the first identification information is greater than or equal to the second identification information carried in the TCP packet, the determining module 12023 determines that the routing information matches the TCP packet.

In an implementation, each secondary route generation unit 1202 may further include a difference set calculation module 12025 and a sending module 12026.

The difference set calculation module 12025 is configured to calculate a first difference set between the routing information and the new routing information, and a second difference set between the new routing information and the routing information.

The sending module 12026 is configured to: when the first difference set is not an empty set but the second difference set is an empty set, send a deletion instruction to the routing node 1205, where the deletion instruction carries the first difference set, and the deletion instruction is used to instruct the routing node to delete the first difference set.

In an implementation, the sending module 12026 is further configured to: when neither the first difference set nor the second difference set is an empty set, send an update instruction to the routing node, where the update instruction carries the first difference set and the second difference set, and the update instruction is used to instruct the routing node 1205 to update the first difference set to the second difference set.

In an implementation, the sending module 12026 is further configured to: when the first difference set is an empty set but the second difference set is not an empty set, send an addition instruction to the routing node, where the addition instruction carries the second difference set, and the addition instruction is used to instruct the routing node 1205 to add the second difference set.

It should be noted that, for content that is not described in the embodiment corresponding to FIG. 12 and specific implementations of steps performed by modules, refer to the embodiments shown in FIG. 1 to FIG. 9 and the foregoing content. Details are not described herein.

Figure 13:
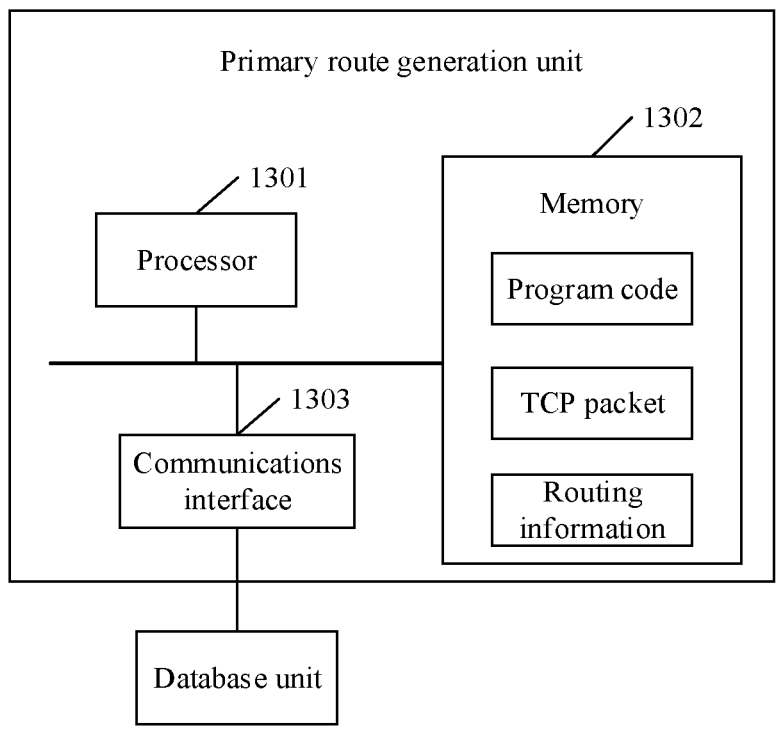
FIG. 13 is a schematic structural diagram of a primary route generation unit according to an embodiment.

In an implementation, related functions implemented by the modules in FIG. 12 may be implemented through a combination of a processor and a communications interface. FIG. 13 is a schematic structural diagram of a primary route generation unit according to an embodiment. The primary route generation unit includes a processor 1301, a memory 1302, and a communications interface 1303. The processor 1301, the memory 1302, and the communications interface 1303 are connected through one or more communications buses.

The processor 1301 includes one or more general-purpose processors. The general purpose-processor may be any type of device that can process an electronic instruction. The general-purpose processor includes a central processing unit (CPU), a microprocessor, a microcontroller, a main processor, a controller, an application-specific integrated circuit (ASIC), or the like. The processor 1301 executes a generation instruction and a transmission instruction of routing information, for example, generates routing information related to a TCP packet, and for another example, sends the routing information and first identification information of the routing information to a database unit. The communications interface 1303 may be a wired interface (for example, an Ethernet interface), and is configured to communicate with the database unit.

The memory 1302 may include a volatile memory, for example, a random-access memory (RAM). The memory may further include a non-volatile memory, for example, a read-only memory (ROM), a flash memory, a hard disk drive (HDD), or a solid-state drive (SSD). Alternatively, the memory may include a combination of the foregoing types of memories. The memory 1302 may store program code, the TCP packet, and the routing information.

The processor 1301 invokes the program code in the memory 1302, to perform the following steps.

The processor 1301 is configured to generate the routing information related to the TCP packet.

The communications interface 1303 is configured to send the routing information and the first identification information of the routing information to a database unit, where the first identification information is determined based on the TCP packet.

It should be noted that, for content that is not described in the embodiment corresponding to FIG. 13 and specific implementations of steps performed by components, refer to the embodiments shown in FIG. 1 to FIG. 9 and the foregoing content. Details are not described herein.

Figure 14:
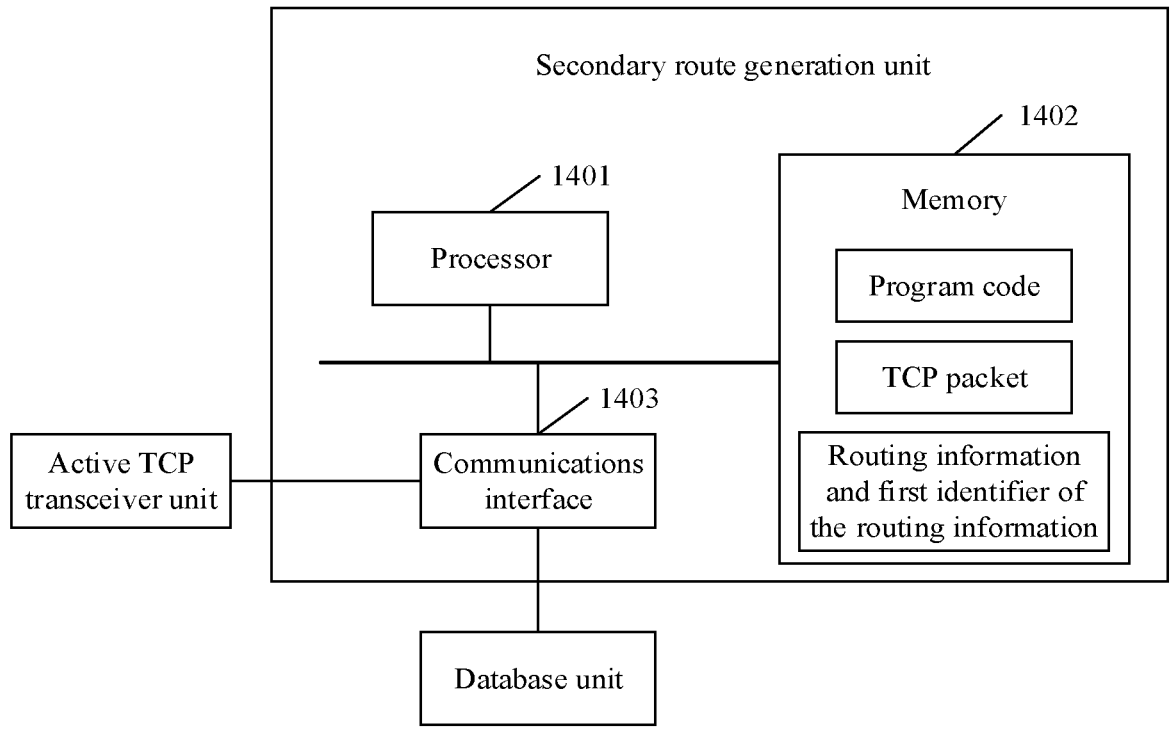
FIG. 14 is a schematic structural diagram of a secondary route generation unit according to an embodiment.

In an implementation, related functions implemented by the modules in FIG. 13 may be implemented through a combination of a processor and a communications interface. FIG. 14 is a schematic structural diagram of a secondary route generation unit according to an embodiment. The secondary route generation unit includes a processor 1401, a memory 1402, and a communications interface 1403. The processor 1401, the memory 1402, and the communications interface 1403 are connected through one or more communications buses.

The processor 1401 includes one or more general-purpose processors. The general-purpose processor may be any type of device that can process an electronic instruction. The general-purpose processor includes a CPU, a microprocessor, a microcontroller, a main processor, a controller, an ASIC, and the like. The processor 1401 executes a routing information matching instruction and a routing information generation instruction, for example, determines, based on first identification information and a TCP packet, that routing information matches the TCP packet, for another example, generates new routing information based on routing information and a TCP packet. The communications interface 1403 may be a wired interface (for example, an Ethernet interface), and is configured to communicate with a database unit and an active TCP transceiver unit.

The memory 1402 may include a volatile memory, for example, a RAM. The memory may further include a non-volatile memory, for example, a ROM, a flash memory, an HDD, or an SSD. The memory may include a combination of the foregoing types of memories. The memory 1402 may store program code, the routing information, the first identification information of the routing information, and the TCP packet.

The processor 1401 invokes the program code in the memory 1402, to perform the following steps.

The communications interface 1403 is configured to receive the routing information and the first identification information of the routing information from the database unit.

The communications interface 1403 is further configured to receive the TCP packet from the active TCP transceiver unit.

The processor 1401 is configured to determine, based on the first identification information and the TCP packet, that the routing information matches the TCP packet.

The processor 1401 is further configured to generate the new routing information based on the routing information and the TCP packet.

It should be noted that, for content that is not described in the embodiment corresponding to FIG. 14 and specific implementations of steps performed by components, refer to the embodiments shown in FIG. 1 to FIG. 9 and the foregoing content. Details are not described herein.

All or some of the foregoing embodiments may be implemented by using software, hardware, firmware, or any combination thereof in the foregoing embodiments. When software is used to implement the embodiments, all or some of the embodiments may be implemented in a form of a computer program product. The computer program product includes one or more computer instructions. When the computer program instructions are loaded and executed on a computer, the procedures or functions according to the embodiments are all or partially generated. The computer may be a general-purpose computer, a dedicated computer, a computer network, or another programmable apparatus. The computer instruction may be stored in a computer-readable storage medium, or may be transmitted by using the computer-readable storage medium. The computer-readable storage medium may be any usable medium accessible by a computer, or a data storage device, such as a server integrating one or more usable media. The usable medium may be a magnetic medium, for example, a floppy disk, a hard disk, or a magnetic tape; or may be an optical medium, for example, a DVD; or may be a semiconductor medium, for example, an SSD.

In the embodiments, unless otherwise specified or there is a logic conflict, terms and descriptions between different embodiments are consistent and may be mutually referenced, and technical features in different embodiments may be combined according to an internal logical relationship thereof, to form a new embodiment.

In this disclosure, "a plurality of" means two or more than two. In the formula, the character "/" indicates a "division" relationship between associated objects.

It may be understood that numerical symbols involved in the embodiments are differentiated merely for ease of description, but are not used to limit the scope of the embodiments. Sequence numbers of the foregoing processes do not mean execution sequences. The execution sequences of the processes should be determined according to functions and internal logic of the processes.

What is claimed is:

1. A method implemented by a primary route generation unit and comprising:
   obtaining a Transmission Control Protocol (TCP) packet;
   decapsulating the TCP packet to obtain data from the TCP packet;
   parsing the data based on a predefined format to obtain routing information; and
   sending, to a database unit, the routing information and identification information of the routing information,
   wherein the identification information is based on the TCP packet.

2. The method of claim 1, further comprising indirectly synchronizing the routing information with a secondary route generation unit and through the database unit.

3. The method of claim 1, wherein the identification information is an end sequence number of the TCP packet.

4. The method of claim 1, wherein the identification information is a timestamp corresponding to the TCP packet.

5. The method of claim 1, wherein the TCP packet comprises a part of or all of the routing information.

6. A method implemented by a secondary route generation unit and comprising:
   receiving, from a database unit, first routing information and first identification information of the first routing information;
   receiving, from an active Transmission Control Protocol (TCP) transceiver unit, a TCP packet;
   making, based on the first identification information and the TCP packet, a determination that the first routing information matches the TCP packet;
   generating, in response to the determination, second routing information based on the first routing information and the TCP packet; and
   sending, to a routing node when a first difference set between the first routing information and the second routing information is not an empty set and when a second difference set between the first routing information and the second routing information is an empty set, a deletion instruction to instruct the routing node to delete the first difference set.

7. The method of claim 6, further comprising stopping, after making the determination, receiving routing information from the database unit.

8. The method of claim 6, further comprising further making the determination when the first identification information is greater than or equal to second identification information in the TCP packet.

9. The method of claim 6, further comprising:
   calculating the first difference set; and
   calculating the second difference set,
   wherein the deletion instruction carries the first difference set.

10. The method of claim 9, further comprising sending, to the routing node when neither the first difference set nor the second difference set is an empty set, an update instruction to instruct the routing node to update the first difference set to the second difference set, wherein the update instruction carries the first difference set and the second difference set.

11. The method of claim 9, further comprising sending, to the routing node when the first difference set is an empty set but the second difference set is not an empty set, an addition instruction to instruct the routing node to add the second difference set, wherein the addition instruction carries the second difference set.

12. A primary route generation unit comprising:
   at least one memory configured to store instructions; and
   at least one processor coupled to the at least one memory and configured to execute the instructions to cause the primary route generation unit to:
      obtain a Transmission Control Protocol (TCP) packet;
      decapsulate the TCP packet to obtain data from the TCP packet;
      parse the data based on a predefined format to obtain routing information; and
      send, to a database unit, the routing information and identification information of the routing information,
      wherein the identification information is based on the TCP packet.

13. The primary route generation unit of claim 12, wherein the at least one processor is further configured to execute the instructions to cause the primary route generation unit to indirectly synchronize the routing information with a secondary route generation unit and through the database unit.

14. The primary route generation unit of claim 12, wherein the identification information is an end sequence number of the TCP packet.

15. The primary route generation unit of claim 12, wherein the identification information is a timestamp corresponding to the TCP packet.

16. The primary route generation unit of claim 12, wherein the TCP packet comprises a part of or all of the routing information.

17. A secondary route generation unit comprising;
   at least one memory configured to store instructions; and
   at least one processor coupled to the at least one memory and configured to execute the instructions to cause the secondary route generation unit to:
      receive, from a database unit, first routing information and first identification information of the first routing information;
      receive, from an active Transmission Control Protocol (TCP) transceiver unit, a TCP packet;
      make, based on the first identification information and the TCP packet, a determination that the first routing information matches the TCP packet;
      generate second routing information based on the first routing information and the TCP packet; and
      send, to a routing node when a first difference set between the first routing information and the second routing information is not an empty set and when a second difference set between the first routing information and the second routing information is an empty set, a deletion instruction to instruct the routing node to delete the first difference set.

18. The secondary route generation unit of claim 17, wherein the at least one processor is further configured to execute the instructions to cause the secondary route generation unit to stop, after making the determination, receiving routing information from the database unit.

19. A computer program product comprising instructions that are stored on a non-transitory computer-readable medium and that, when executed by a processor, cause a primary route generation unit to:
  obtain a Transmission Control Protocol (TCP) packet;
  decapsulate the TCP packet to obtain data from the TCP packet;
  parse the data based on a predefined format to obtain routing information; and
  send, to a database unit, the routing information and identification information of the routing information,
  wherein the identification information is based on the TCP packet.

20. A computer program product comprising instructions that are stored on a non-transitory computer-readable medium and that, when executed by a processor, cause a secondary route generation unit to:
  receive, from a database unit, first routing information and first identification information of the first routing information;
  receive, from an active Transmission Control Protocol (TCP) transceiver unit, a TCP packet;
  make, based on the first identification information and the TCP packet, a determination that the first routing information matches the TCP packet;
  generate, in response to the determination, second routing information based on the first routing information and the TCP packet; and
  send, to a routing node when a first difference set between the first routing information and the second routing information is not an empty set and when a second difference set between the first routing information and the second routing information is an empty set, a deletion instruction to instruct the routing node to delete the first difference set.

* * * * *